US00RE47779E

(19) United States
(12) Reissued Patent
Tanaka et al.

(10) Patent Number: US RE47,779 E
(45) Date of Reissued Patent: Dec. 24, 2019

(54) SIMPLE ELECTRONIC MUSICAL INSTRUMENT, PLAYER'S CONSOLE AND SIGNAL PROCESSING SYSTEM INCORPORATED THEREIN

(71) Applicant: YAMAHA CORPORATION, Hamamatsu-shi (JP)

(72) Inventors: So Tanaka, Hamamatsu (JP); Minoru Harada, Hamamatsu (JP)

(73) Assignee: YAMAHA CORPORATION, Hamamatsu-Shi (JP)

(21) Appl. No.: 14/735,641

(22) Filed: Jun. 10, 2015

Related U.S. Patent Documents

Reissue of:
(64) Patent No.: 6,753,467
Issued: Jun. 22, 2004
Appl. No.: 10/252,436
Filed: Sep. 24, 2002

(30) Foreign Application Priority Data

Sep. 27, 2001 (JP) ..... 2001-296309
Sep. 27, 2001 (JP) ..... 2001-296310
(Continued)

(51) Int. Cl.
*G10H 3/00* (2006.01)
*G10H 3/14* (2006.01)

(52) U.S. Cl.
CPC ..... *G10H 3/146* (2013.01)

(58) Field of Classification Search
CPC ..... G10H 3/146
(Continued)

(56) References Cited

U.S. PATENT DOCUMENTS 4,581,973 A 4/1986 Hoshino
4,700,602 A 10/1987 Bozzio
(Continued)

FOREIGN PATENT DOCUMENTS

JP 6366896 U 5/1988
JP 01112292 A 4/1989
(Continued)

OTHER PUBLICATIONS

Office Action issued in U.S. Appl. No. 10/252,436, dated Jun. 5, 2003.
(Continued)

*Primary Examiner* — Cameron Saadat
(74) *Attorney, Agent, or Firm* — Rossi, Kimms & McDowell LLP

(57) ABSTRACT

An electronic musical instrument is equipped with plural series combinations of switches and resistors and a piezoelectric transducer associated with a movable member for producing electric signals representative of player's intentions to music sound to be generated, and a signal processing system processes the signals for generating the music sound; the signal processing system has a voltage discriminator so that the plural series combinations are connected in parallel to the voltage discriminator through a single conductive line; a vibration absorber is inserted between the movable member and the piezoelectric transducer so that the piezoelectric transducer exactly converts the motion of the movable member to the electric signal at each player's manipulation.

38 Claims, 20 Drawing Sheets

(30) Foreign Application Priority Data

Sep. 27, 2001 (JP) ..... 2001-296311
Jan. 11, 2002 (JP) ..... 2002-005021

(58) Field of Classification Search
USPC ..... 84/723
See application file for complete search history.

(56) References Cited

U.S. PATENT DOCUMENTS 5,042,356 A 8/1991 Karch ..... G10D 13/024 84/104
5,134,920 A 8/1992 Clark
5,293,000 A 3/1994 Adinolfi
5,345,037 A 9/1994 Nordelius
5,856,628 A * 1/1999 Noguchi ..... G10H 3/146 84/421
5,920,026 A 7/1999 Yoshino et al.
6,031,176 A 2/2000 Tanaka
6,072,112 A 6/2000 Suenaga et al.
6,121,538 A * 9/2000 Yoshino et al. ..... 84/738
6,271,458 B1 8/2001 Yoshino et al.
6,525,249 B1 * 2/2003 Suenaga ..... 84/411 R
2004/0083873 A1 * 5/2004 Yoshino ..... G10D 13/024 84/107

FOREIGN PATENT DOCUMENTS

JP 09198040 A 7/1997
JP 3710566 B2 10/2005
WO 8604718 A1 8/1986
WO WO 86/04718 9/1986

OTHER PUBLICATIONS

Notice of Allowance issued in U.S. Appl. No. 10/252,436, dated Dec. 19, 2003.
Office Action issued in JP2001-296311 dated Dec. 27, 2004. English translation provided.
Office Action issued in EP02020892.2 dated Oct. 16, 2006.
Office Action issued in EP02020892.2 dated Jul. 20, 2007.
European Search Report issued in EP02020892.2 dated Feb. 7, 2003.

* cited by examiner

SIMPLE ELECTRONIC MUSICAL INSTRUMENT, PLAYER'S CONSOLE AND SIGNAL PROCESSING SYSTEM INCORPORATED THEREIN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*This is a reissue of U.S. Pat. No. 6,753,467, which issued on Jun. 22, 2004 and was filed as U.S. patent application Ser. No. 10/252,436 on Sep. 24, 2002. The contents of U.S. patent application Ser. No. 10/252,436 are hereby incorporated herein by reference.*

FIELD OF THE INVENTION

This invention relates to an electronic musical instrument and, more particularly, to an electronic musical instrument such as an electronic percussion instrument, a player's console on which a musician performs for producing electric signals and a signal processing system for producing an audio signal representative of the music sound.

DESCRIPTION OF THE RELATED ART

Various sorts of electronic percussion instrument have been proposed and sold in the market. An electronic drum is a typical example of the electronic percussion instruments, and largely comprises a rim, a head, a head sensor and a rim sensor. The head is stretched over the rim, and the head sensor and rim sensor are attached to the head and the rim, respectively. The head sensor and rim sensor convert the vibrations of the head and the vibrations of the rim to respective electric signals, and beat sound and rim shot sound are independently produced on the basis of the electric signals.

A typical example of the electronic drum is disclosed in Japanese Patent Application laid-open No. hei 6-175651. The prior art electronic drum disclosed in the Japanese Patent Application laid-open comprises a saucer-shaped drum body made of hard rubber, a pad plate supported by the saucer-shaped drum body through cushions, a pad rubber stretched over the front surface of the pad plate, a semi-circular rim plate fixed to the periphery of the saucer-shaped drum body and two sensors. The two sensors are implemented by piezoelectric transducers. One of the piezoelectric transducers is attached to the reverse surface of the pad plate, and the other piezoelectric transducer is attached to the inner surface of the semi-circular rim plate. A lead cable is connected to the piezoelectric transducer attached to the pad plate, and another lead cable is connected to the other piezoelectric transducer attached to the rim plate.

While a drummer is beating the pad rubber with sticks, the pad plate vibrates, and the vibrations of the pad plate are converted through the piezoelectric transducer to an electric signal. When the drummer gives rim shots to the rim plate, vibrations are propagated through the rim plate to the piezoelectric transducer, and the vibrations are converted to another electric signal. The electric signals are independently propagated through the lead cables to a signal processing system. Drum sound and rim shot sound are produced on the basis of the electric signals through a signal processing in the signal processing system. Thus, the prior art electronic drum requires two sensors and two lead cables for propagating the electric signals from the two sensors to the signal processing system.

Another prior art electronic drum has a single film switch and a piezoelectric transducer. The vibrations are converted through the piezoelectric transducer to an electric signal, and the electric signal is propagated through a lead cable to a signal processing system. The film switch is also connected through a lead cable to the signal processing system. When the film switch is depressed, an electric signal is supplied from the film switch through another lead cable to the signal processing system. The signal processing system is responsive to the electric signal supplied from the film switch so as to determine the timbre of drum sound. When the film switch is opened, the signal processing system gives one of the two envelops to the electric signal representative of the drum sound, and the drum sound is produced at a timbre corresponding to the given envelope. On the other hand, when the film switch is closed, the signal processing unit gives the other envelope to the electric signal, and the drum sound is produced at another timbre. Thus, the prior art electronic drum also requires two sensors and two lead cables.

FIG. 1 shows a typical example of the signal processing system available for an electronic drum. The prior art electronic drum is broken down into a head unit 100, a signal processing unit 200 and a stereocable 300. The separate-type electronic drum is preferable, because the signal processing unit 200 is free from the beats on the head unit 100.

The contour of the head unit 100 is shown in FIGS. 2A and 2B. The electronic drum is corresponding to a snare drum. The head unit 100 includes a rim 102 and a head 104. The rim 102 has a ring shape, and the head 104 is stretched over the rim 102. The head unit 100 further includes a piezoelectric transducer 110 and a rim-shot switch 120, which are provided in association with the head 104 and the rim 102, respectively. The piezoelectric transducer 110 is connected between a signal terminal 112 and a ground terminal 114, and the rim-shot switch 120 is connected between another signal terminal 116 and the ground terminal 114. Thus, the piezoelectric transducer 110 and the rim-shot switch 120 are arranged in parallel in the electronic drum 100.

The piezoelectric transducer 110 converts vibrations of the head 104 to an electric signal, the waveform of which is representative of the vibrations. The electric signal is supplied from the signal terminal 112 to the signal processing system 200. On the other hand, the rim-shot switch 120 is implemented by a normally-off type switch. When a drummer gives a rim shot to the rim 102, the rim-short switch 120 turns off, and changes the potential level at the signal terminal 116 to the ground. The potential level at the signal terminal 116 is supplied to the signal processing system 200 as a detecting signal.

The prior art signal processing system 200 includes an envelope extractor 210, a Schmitt trigger-inverter circuit 220, a central processing unit 230, an analog-to-digital converter 231, two signal terminals 232/234 and a ground terminal 236. The Schmitt trigger-inverter circuit 220 has the threshold of the order of 0.6 volt. The signal terminal 232 is connected to an input node of the Schmitt trigger-inverter circuit 220, and is further connected to a power supply line 238 through a resistor element 240. The output node of the Schmitt trigger-inverter circuit 220 is connected to a signal port of the central processing unit 230. The other signal terminal 234 is connected to an input node of the envelope extractor 210, and the ground terminal 236 is grounded. Thus, the signal terminals 232/234 and the ground terminal 236 are connected in parallel through the stereocable 300 to the signal terminals 116/112 and the ground terminal 114, and the three conductive lines are incorporated in the stereocable 300. The positive potential is supplied from the power supply line 238 through the resistor element 240 to the signal terminal 232, which in turn supplies the positive potential through the stereocable 300 to the signal terminal 116. The output node of the envelope extractor 210 is connected through the analog-to-digital converter 231 to the signal port of the central processing unit 230.

The envelope extractor 210 is a combined circuit of amplifier, rectifier and integrator. While a drummer is beating the head 104, the piezoelectric transducer 110 generates the electric signal representative of the vibrations of the head 104, and the electric signal is supplied from the piezoelectric transducer 110 through the stereocable 300 to the input node of the envelope extractor 210. The envelope extractor 210 amplifies and rectifies the electric signal, and integrates the rectified electric signal for generating an envelope signal representative of the envelope of the waveform. The envelope extractor 210 supplies the envelope signal to the analog-to-digital converter 231, and the analog-to-digital converter 231 converts discrete values of the envelope signal to corresponding binary codes. The series of binary codes is representative of the envelope of the waveform, and is fetched by the central processing unit 230 for producing music data codes representative of drum sound.

While the drummer is beating only the head 104, the rim-shot switch 120 is turned off, and the detecting signal has the positive potential. The Schmitt trigger-inverter circuit 220 maintains the output signal at the ground level, and the central processing unit 230 determines that the drummer beats the head 104. The central processing unit 230 determines the loudness of the drum sound in proportion to the intensity of the beat, and gives the standard timbre of the snare drum sound to music data codes representative of electronic drum sound. The music data codes are converted to an audio signal, and the snare drum sound is produced from a sound system (not show).

The drummer is assumed to give rim shots to the rim 102. The rim-shot switch 120 turns on, and current flows through the rim-shot switch 120 to the ground. Then, the potential level at the signal terminal 116 is decayed, and the Schmitt trigger-inverter circuit 220 changes the output signal to a high level. The high level at the signal port notifies the central processing unit 230 that the drummer gives the rim shots to the rim 102. The piezoelectric transducer 110 converts the vibrations generated through the rim shorts to the electric signal, and a series of binary codes are supplied from the analog-to-digital converter to the central processing unit 230. The central processing unit 230 gives another timbre corresponding to the rim shot sound to the music data codes, and determines the loudness in proportion to the intensity of the beat. The music data codes are also converted to the audio signal, and the rim shot sound is produced from the sound system.

An electronic cymbal is another family member of the electronic percussion instrument. The electronic cymbal is corresponding to a top cymbal, and includes a cymbal plate, a signal processing unit and a stereocable. The cymbal plate has a cup portion and a rim portion. Two sensors are respectively provided for the cup portion and rim portion, and are connected to the signal processing system through the stereocable as similar to the electronic snare drum. The signal processing unit processes pieces of data information supplied from the two sensors, and determines the timbre to be given to the percussion sound.

A problem inherent in the prior art electronic percussion instrument is the complicated structure. In detail, the head unit/cymbal plate requires plural sensors equal to the portions to be beaten with a stick or sticks, i.e., sorts of sticking, and the plural sensors are to be independently connected to the signal processing system. The prior art head unit 100 has two portions 102/104 to be beaten by a drummer, and, accordingly, two sensors 110/120 are required for the head unit 100. The electric signals are separately supplied through the two conductive lines of the stereocable 300 from the sensors 110/120 to the circuitries 210/220. The prior art cymbal plate also has two portions to be beaten with a stick, and, accordingly, two sensors are required for the cymbal plate. The electric signals are separately propagated through two conductive lines of the stereocable to the signal processing system. If the head unit 100 is expected to discriminate more than two sorts of sticking from one another, more than two sensors and more than two conductive lines are required for the head unit 100. It is well known to skilled persons that the rim is beaten through two sorts of sticking, i.e., the open rim shot (see FIG. 2A) and the close rim shot. When a drummer gives the open rim shots to the head unit 100, the drummer concurrently beats the head 104 and a certain part of the rim 102 near him or her. On the other hand, when a drummer gives the close rim shots to the head unit 100, the drummer beats another part of the rim 102 father from him or her than the certain part, and brings his or her fingers into contact with the head 104. For this reason, two rim-shot switches are required for discriminating the open rim shots from the close rim shots, and the total number of the sensors are increased to three. The beats on the head 102 are hereinbelow referred to as "pad shots" in order to discriminate the beat on the head 104 from the two sorts of rim shots. Thus, the prior art electronic percussion instrument requires a large number of component parts, which is causative of the complicated structure.

SUMMARY OF THE INVENTION

It is therefore an important object of the present invention to provide an electronic musical instrument, which is simple in structure.

It is also an important object of the present invention to provide a player's console, which makes the electronic musical instrument simple.

It is also an important object of the present invention to provide a signal processing unit, which makes the electronic percussion instrument simple.

In accordance with one aspect of the present invention, there is provided an electronic musical instrument for generating electronic sound comprising a player's console having plural interfaces to which a player selectively expresses intentions to the electronic sound, and producing signals representative of the intentions, a signal processing system processing the signals so as to determine the intentions and producing the sound in which the intentions are expressed, signal paths connected between the player's console and the signal processing system for propagating the signals from the player's console to the signal processing system, and an assistant provided in association with at least one of the plural interfaces and the signal processing system so as to make the intentions clear.

In accordance with another aspect of the present invention, there is provided a player's console for a musician, comprising plural vibratory members in which the musician selectively gives rise to vibrations through sticking for expressing intentions to music sound, a converter associated with the plural vibratory members for converting an attribute of the vibrations to a first signal and connected to a first signal terminal, and plural converters including plural sensors selectively associated with the plural vibratory members and changed between first state and second state for varying the amount of current passing though the sensors in the first state and at least one resistor selectively connected to the plural sensors and for varying the resistance against the current and connected to a second signal terminal for producing a voltage signal representative of the intentions.

In accordance with yet another aspect of the present invention, there is provided a player's console for a musician comprising plural vibratory members in which the musician selectively gives rise to vibrations through sticking for expressing intentions to music sound, a converter associated with the plural vibratory members for converting an attribute of the vibrations to a signal, and a vibration absorber connected between one of the plural vibratory members and the converter and decaying the vibrations immediately after each of the impacts in the sticking for giving the signal peaks respectively representing the impacts.

In accordance with still another aspect of the present invention, there is provided a data processing system for producing a music signal representative of music sound comprising a first signal terminal for receiving a first analog signal stepwise varied in potential level for expressing player's intentions to the music sound, a second signal terminal for receiving a second analog signal representative of an attribute of the music sound, a discriminator connected to the first signal terminal and determining the player's intentions on the basis of the potential level of the first analog signal for producing an output signal representative of the player's intentions, and an information processing unit connected to the second signal terminal and the discriminator and processing the output signal and the second analog signal for producing the music signal representative of the music sound in which the player's intentions are expressed and to which the attribute is imparted.

BRIEF DESCRIPTION OF THE DRAWINGS

The features and advantages of the electronic percussion instrument, head unit and signal processing system will be more clearly understood from the following description taken in conjunction with the accompanying drawings, in which.

DESCRIPTION OF THE PREFERRED EMBODIMENTS

First Embodiment

System Configuration of Electronic Drum

Figure 1:
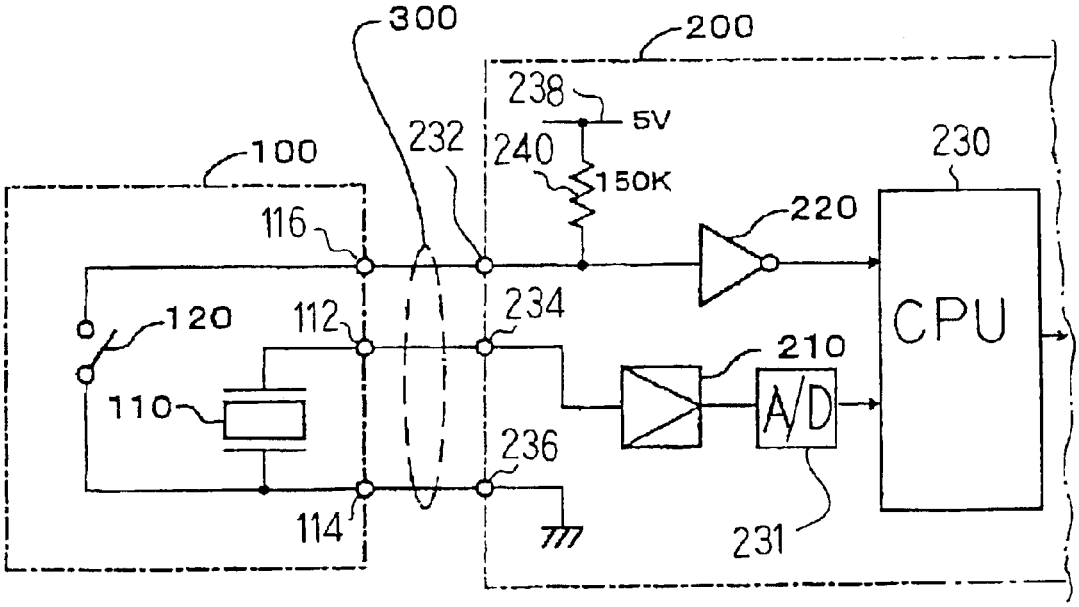
Fig. 1 PRIOR ART
FIG. 1 is a circuit diagram showing the circuit configuration of the prior art signal processing system.
Figure 2A:
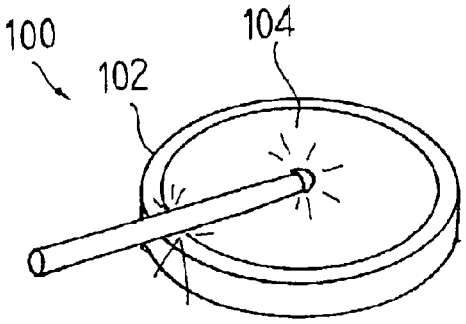
Fig. 2 A PRIOR ART
FIGS. 2A and 2B are schematic perspective views showing the prior art electronic drum given the different rim shots.
Figure 2B:
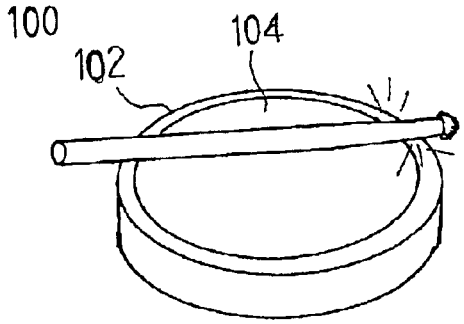
Fig. 2 B PRIOR ART
Figure 3:
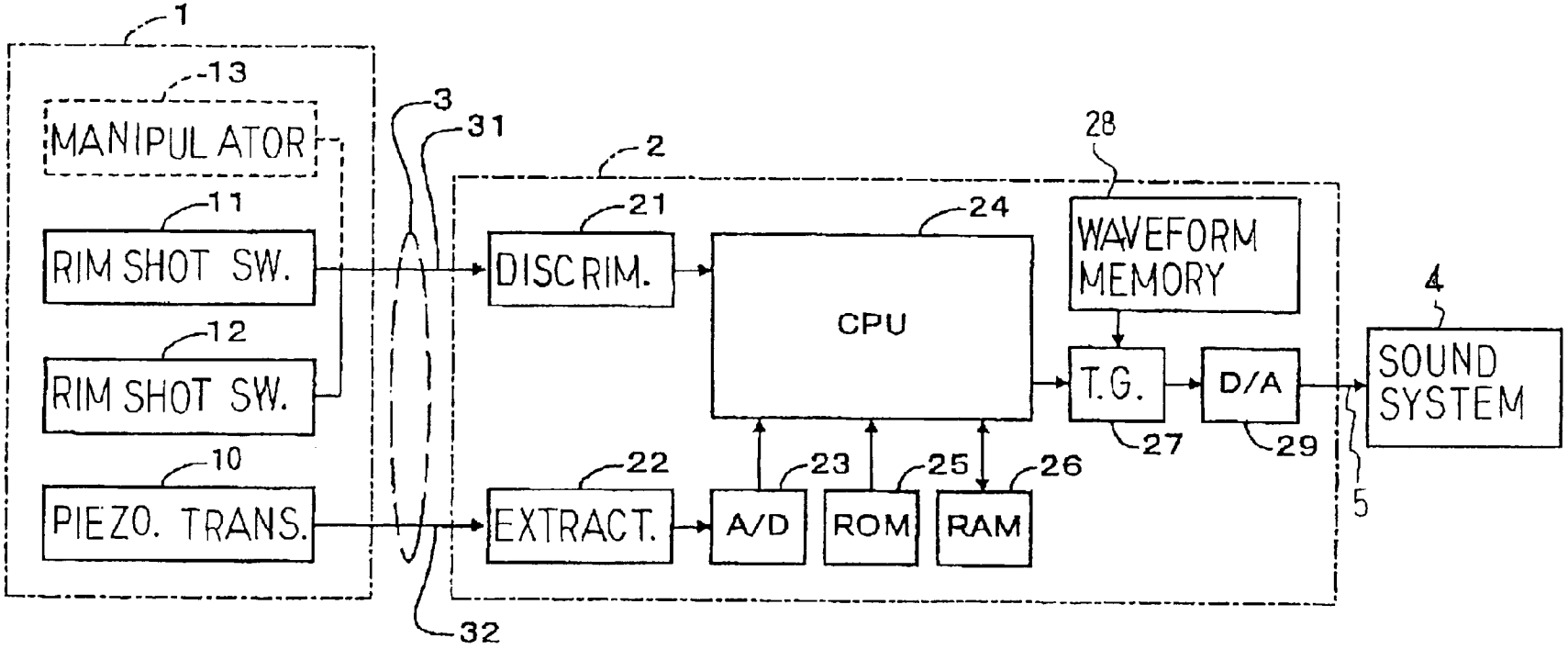
FIG. 3 is block diagram showing the system configuration of an electronic drum according to the present invention.

Referring to FIG. 3 of the drawings, an electronic drum embodying the present invention largely comprises a head unit 1, a single processing system 2, a stereocable 3, a sound system 4 and a lead cable 5. The head unit 1 is corresponding to the player's console. The head unit 1 is electrically connected to the signal processing system 2 through the stereocable 3, and the signal processing system 2 is connected to the sound system 4 through the lead cable 5. The head unit 1 is beaten with sticks. While a drummer is beating the head unit 1, vibrations take place in the head unit 1, and the head unit 1 generates electric signals representative of one of the different sorts of sticking as well as vibrations by means of sensors. The electric signals are supplied from the head unit 1 through the stereocable 3 to the signal processing system 2. A twin core shielded cable may be used as the stereocable 3. In case where the stereocable 3 represents the twin core shield cable, the shield line is not shown in FIG. 3. Otherwise, a three core cable is available for the communication between the head unit 1 and the signal processing system 2. The signal processing system 2 converts the electric signals to digital signals, and analyzes the digital signals for producing music data codes representative of drum sound. The signal processing system 2 converts the music data codes to an audio signal, and transfers the audio signal to the sound system 4 through the lead cable 5. The sound system 4 produces the drum sound from the audio signal.

The conductive lines assigned to the electric signals are less than the sensors incorporated in the head unit 1. Thus, the electronic drum implementing the first embodiment is simpler than the prior art electronic drum.

The head unit 1 and signal processing system 2 are hereinbelow described in more detail. The head unit 1 is equipped with three sensors 10/11/12. The three sensors 10/11/12 and associated resistor as a whole constitute the plural interfaces. The first sensor 10 is implemented by a piezoelectric transducer, and converts the vibrations to an analog signal representative of the vibrations. The analog signal is transferred from the piezoelectric transducer 10 to the signal processing system 2 through one of the conductive lines 32. On the other hand, the second and third sensors 11/12 are implemented by two film switches of normally-off type. The close rim shot and open rim shot are detected by the film switches 11 and 12, respectively, and the detecting signal is propagated through the conductive line 31 to the signal processing system 2. Thus, the single conductive line 31 is shared between the plural switches 1 and 12, and makes the electronic drum simple. As will be described in conjunction with the signal processing system 2, the open rim shot is discriminated from the close rim shot by the signal processing system 2.

In this instance, the rim shot switches and piezoelectric discriminator 10 are incorporated in the head unit 1. However, another sort of manipulator 13 may be further incorporated in the head unit 1 as indicated broken lines in FIG. 3. The sticking discriminator 13 will be described hereinafter in detail.

The signal processing system 2 includes a sticking discriminator 21 and an envelope extractor 22. The sticking discriminator 21 is connected to the rim shot switches 11/12 through the conductive line 31. The sticking discriminator 21 determines which rim short switch 11 or 12 the drummer closes through the sticking, and outputs a 2-bit detecting signal representative of the rim shot switch 11 or 12 closed with the stick.

On the other hand, the envelope extractor 22 is connected to the piezoelectric transducer 10 through the conductive line 32, and extracts an envelope of the waveform from the analog signal. The envelope extractor is a combined circuit of an amplifier, a half-wave rectifier and an integrator. The envelope extractor 22 outputs an envelope signal representative of the envelope extracted from the analog signal.

The signal processing system 2 further includes an analog-to-digital converter 23, a central processing unit 24, i.e. CPU, a read only memory 25, i.e., ROM and a random access memory 26, i.e., RAM. The envelope extractor 22 is connected to the analog-to-digital converter 23, and the envelope signal is supplied to the analog-to-digital converter 22. The analog-to-digital converter 22 samples the potential level of the envelope signal at regular intervals, and converts the discrete potential values to a digital envelope signal. Programmed instructions and pieces of data are stored in the read only memory 25, and the random access memory 26 serves as a working memory. The central processing unit 24 has a signal port, and the sticking discriminator 21, analog-to-digital converter 23, read only memory 25 and random access memory 26 are connected to the signal port.

The central processing unit 24 fetches the program codes representative of the programmed instructions, and processes the pieces of data information stored in the 2-bit detecting signal and digital envelope signal through execution of the programmed instructions for producing music data codes. The central processing unit 24 determines what sort of sticking the drummer gives the head unit 1 on the basis of the pieces of data information stored in the 2-bit detecting signal, and selects parameters representative of a sort of timbre to be imparted to drum sound. The central processing unit 24 further determines the intensity of the shot and times at which the drummer gives the shots to the head unit 1 on the basis of the envelope stored in the digital envelop signal. The central processing unit 24 selects parameters representative of timbre and velocity, i.e. the intensity of the shot, and produces music data codes representative of the parameters, the note-on timings and so forth. Any one of the sorts of the timbre corresponding to the open rim shots on a snare drum, the close rim shots on the snare drum and the pad shots on the snare drum is imparted to the drum sound. The music data codes are output from the central processing unit 24.

The signal processing system 2 further comprises a tone generator 27, a waveform memory 28 and a digital-to-analog converter 29. The tone generator 27 is connected to the signal port of the central processing unit 24, the waveform memory 28 and the digital-to-analog converter 29. The tone generator 27 is responsive to the music data codes for producing a digital music signal representative of the drum sound to be produced. In detail, when a music data code representative of the note-on timing reaches the tone generator 27, the tone generator accesses the waveform memory 28, and sequentially reads out pieces of waveform data for producing the waveform of the drum sound with the selected timbre. The tone generator 27 produces the digital music signal, and modifies the digital music signal for controlling the loudness and effects. The digital music signal is supplied from the tone generator 27 to the digital-to-analog converter 29. The digital-to-analog converter 29 converts the digital music signal to the audio signal, and supplies the audio signal through the lead cable 5 to the sound system 4. The audio signal is converted to the drum sound through the sound system 4. The drum sound has the timbre specified by the parameters. The digital music signal makes the audio signal and, accordingly, the drum sound corresponding to each shot automatically decayed along the given envelope.

As will be understood from the foregoing description, the sticking discriminator 21 is incorporated in the electronic drum implementing the first embodiment. The conductive line 31 is shared between the plural rim shot switches 11 and 12 so that the electronic drum becomes simpler than the prior art electronic percussion instrument.

Head Unit

Figure 4:
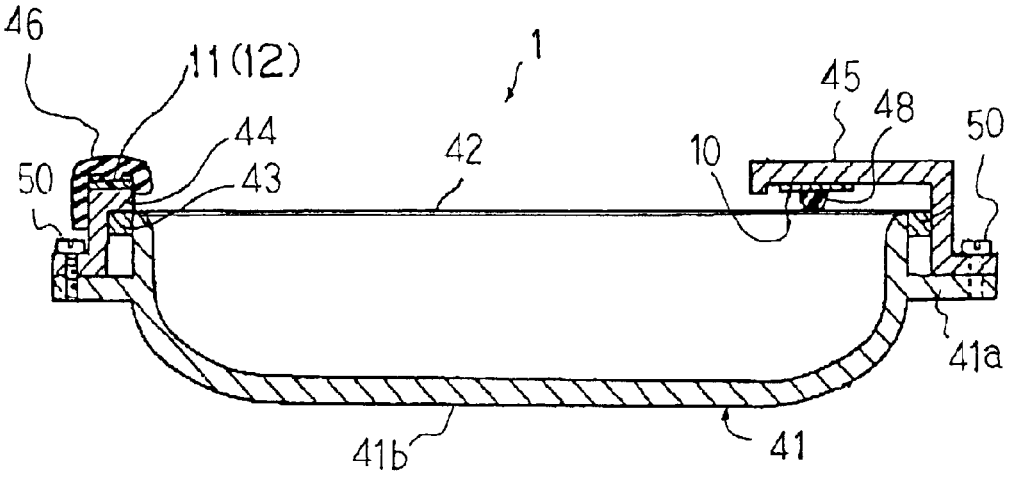
FIG. 4 is a cross sectional view showing the structure of a head unit incorporated in the electronic drum.
Figure 5:
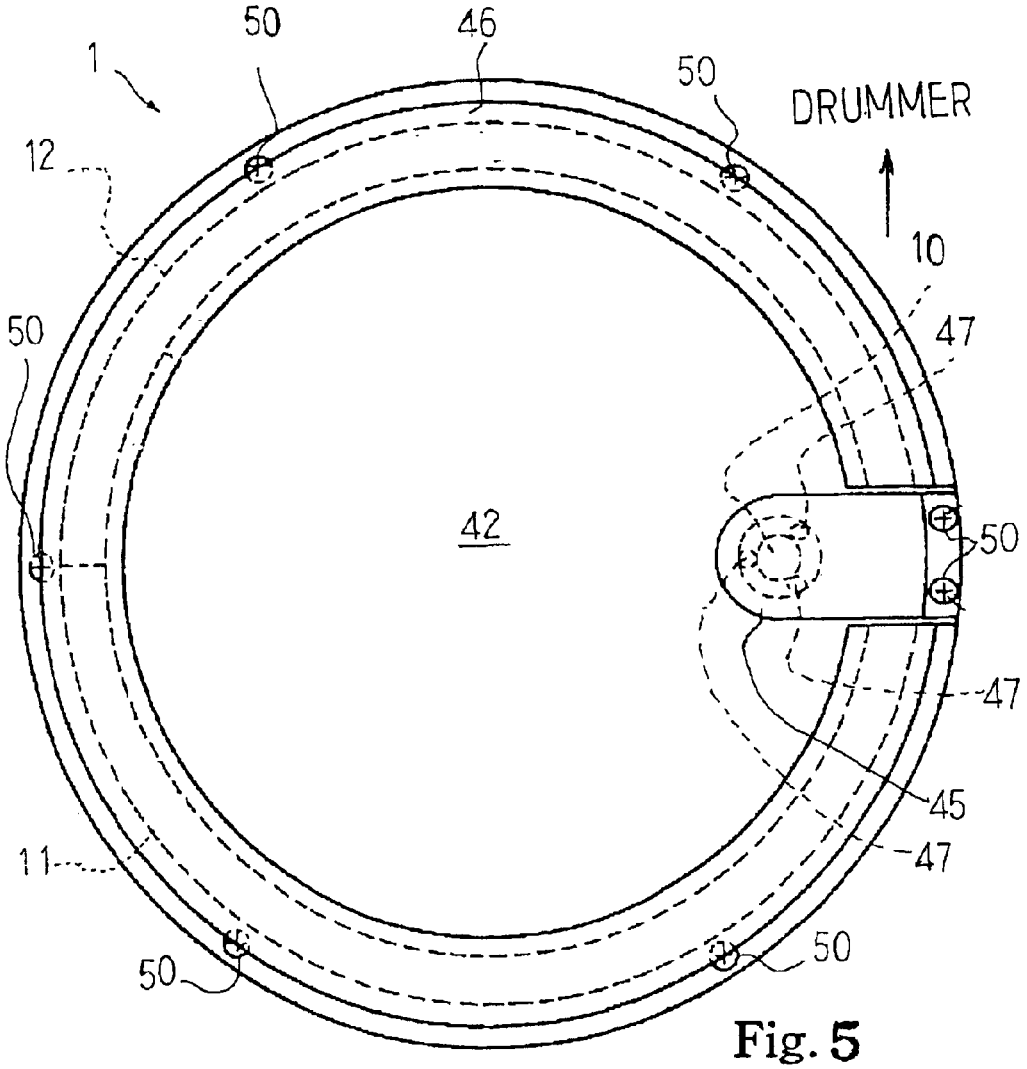
FIG. 5 is a plane view showing the layout of sensors in the head unit.
Figure 6:
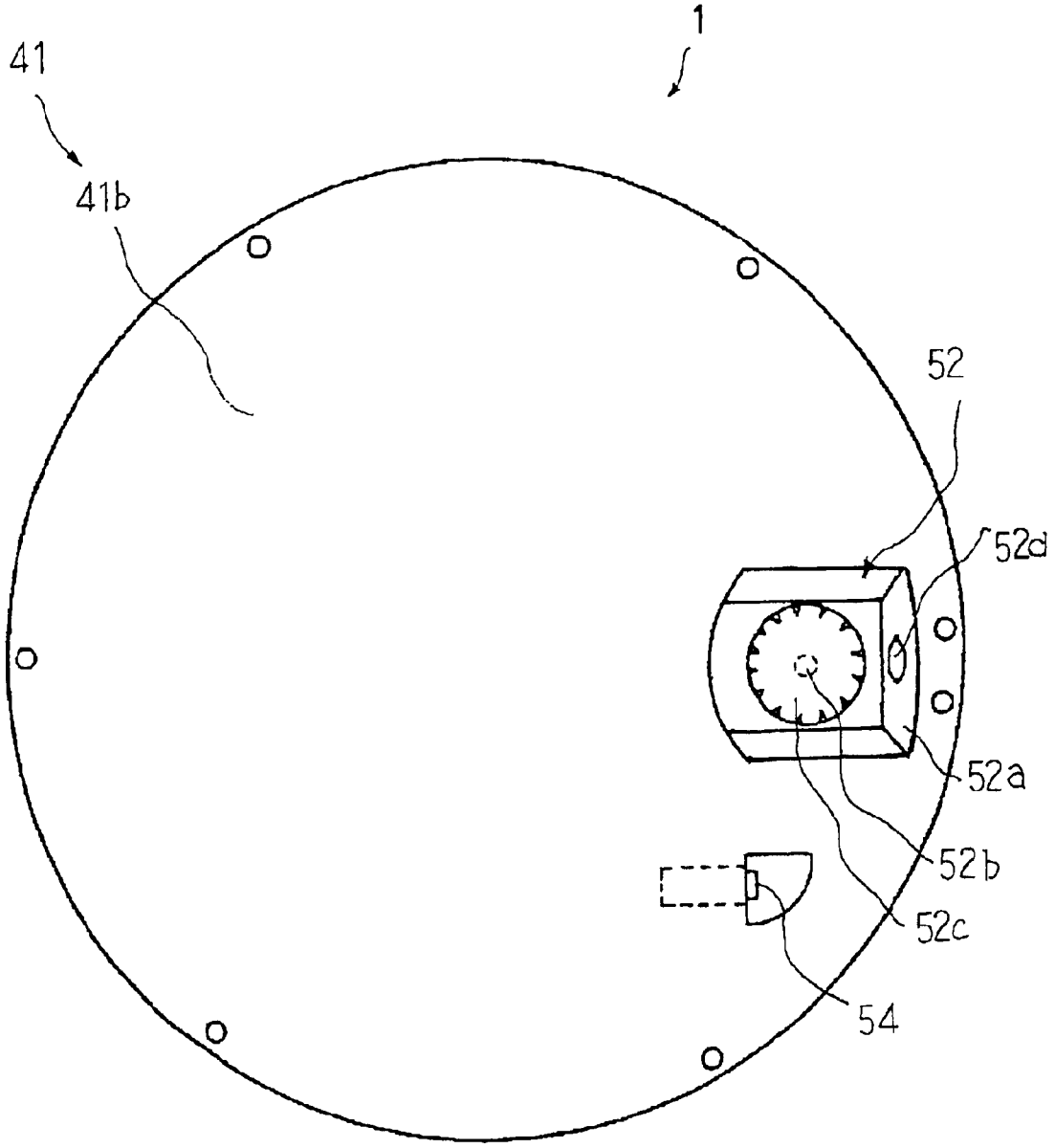
FIG. 6 is a bottom view showing the arrangement of the reverse surface of the head unit.

FIGS. 4, 5 and 6 show the head unit 1. The head unit 1 is equivalent to a snare drum. The head unit 1 comprises a bottom case 41, a head 42, an outer ring 43, a rim 44, a sensor holder 45 and a rim cushion 46. The head 42 extends over the bottom case 41, and the peripheral portion of the head 42 is sandwiched between the outer ring 43 and the bottom case 41. The rim 44 keeps the outer ring 43 around the periphery of the bottom case 41. The sensor holder 45 is secured to the bottom case 41, and inwardly projects from the periphery of the bottom case 41.

The piezoelectric transducer 10 is fixed to the sensor holder 45, and picks up vibration waves of the head 42. The rim shot switches 11 and 12 are implemented by semi-circular film switches. The semi-circular film switches 11/12 are provided on the upper surface of the rim 44, and the rim 44 is capped with the rim cushion 46. Thus, the semi-circular film switches 11/12 are provided between the rim 44 and the rim cap 44, and turn on when a drummer strikes the rim cushion 46 with the sticks. The semi-circular film switch 12 is located closer to the drummer than the other semi-circular film switch 11. When the drummer gives the close rim shots to the part of the rim cushion 46 over the semi-circular film switch 11, the semi-circular film switch 11 turns on, and electric current flows through the semi-circular switch 11. On the other hand, when the drummer gives the open rim shots to another part of the rim cushion 46 over the other semi-circular film switch 12, the semi-circular film switch 12 turns on, and permits the electric current to flow therethrough.

The bottom case 41 has a contour like a pan, and a brim 41a outwardly projects from the periphery of the bottom portion 41b. Female screws are formed in the brim 41a at intervals. In this instance, the bottom case 41 is made of aluminum, and is shaped through a die-casting. However, the bottom case of another head unit may be made of fiber reinforced synthetic resin or wood.

The outer ring 43 has the inner diameter slightly larger in value than the outer diameter of the bottom case 41, and is used for securing the head 42 to the bottom case 41. The rim 44 is made of metal or alloy, and has a contour like the letter "C". The rim 44 has a cross section like the letter "z". The upper portion of the rim 44 inwardly projects from the intermediate portion, and the lower portion outwardly projects from the intermediate portion. Through-holes are formed in the outwardly projecting lower portion at intervals, and are to be aligned with the female screws formed in the brims 41a. The rim 44 is secured to the brim 41a by means of bolts 50. The intermediate portion of the rim 44 has an inner diameter approximately equal to the outer diameter of the outer ring 43, and the distance between the outwardly projecting lower portion and the inwardly projecting upper portion is approximately equal to the distance between the brim 41a and the upper periphery of the bottom case 41. Thus, the upper portion of the rim 44 is held in contact with the outer ring 43, and prevents the outer ring 43 from coming out.

The head 42 is wider than the opening of the bottom case 41, and is made of skin or synthetic resin film. Otherwise, the head is made from a sheet of textile fabric or net of fine meshes. Two sheets of plain weave fabrics are laminated in such a manner that the fibers of one sheet of plain weave fabric cross the fibers of the other sheet of plain weave fabric at right angles.

The sensor holder 45 is made of metal or alloy, and is as narrow as the gap in the C-letter like rim 44. Even if a drummer mistakenly strikes the sensor holder 45 with the sticks, the sensor holder 45 is never broken. The sensor holder 45 has the upper portion inwardly projecting from the intermediate portion and the lower portion outwardly projects from the intermediate portion. Two through-holes are formed in the outwardly projecting lower portion, and are to be aligned with two female screws formed in the brim 41a. Bolts 50 are screwed through the through-holes into the female screws so that the sensor holder 45 is fixed to the brim 41a.

The inwardly projecting upper portion is so long that the innermost end reaches a space over the head 42. The piezoelectric transducer 10 is secured to the lower surface of the leading end of the sensor holder 45 by means of pieces of vibration absorbing adhesive compound 47 such as, for example, butyl rubber. In this instance, three pieces of butyl rubbers 47 occupy three vertexes of a virtual triangle on the upper surface of the disc-shaped piezoelectric transducer 10 so that the disc-shaped piezoelectric transducer 10 is secured to the sensor holder 45 in stable.

A vibration absorber 48 is attached to the piezoelectric transducer 10. The vibration absorber 48 downwardly projects from the piezoelectric transducer 10, and is held in contact with the head 42 at the lower end thereof. The vibration absorber 48 is made of rubber or urethane sponge. The vibration absorber 48 rapidly decays the vibrations, and makes the envelope extractor 22 exactly acknowledge the shot.

The rim cushion 46 is made of rubber, and has a contour like the letter "C". A dent is formed in the rim cushion 46 along the inner surface thereof, and the film switches 11/12 are received in the dent. The rim 44 is capped with the rim cushion 46, and the film switches 11/12, i.e., the rim shot switches are sandwiched between the upper surface of the rim 44 and the inner surface of the rim cushion 46.

The head unit 1 further includes a coupler 52 and a connector 54. As will be seen in FIG. 6, the coupler 52 is fixed to the bottom portion 41b of the bottom case 41, and the connector 54 is embedded in the bottom case 41. The coupler 52 is used for connecting the head unit 1 with a drum stand (not shown), and the connector 54 is used for coupling the sensors 10/11/12 to the stereocable 3.

The coupler 52 includes a block 52a and a set screw 52b with a knob 52c. The block 52a is fixed to the bottom portion 41b, and is formed with a hole 52d. Though not shown in the drawings, the drum stand includes a pedestal and a rod. The rod projects from the pedestal. When a drummer connects the head unit 1 to the drum stand, the drummer loosens the set screw 52b for retracting it from the hole 52d, and inserts the rod into the hole 52a. The drummer turns the knob 52c in the direction to make the set screw 52b project into the hole 52a. The set screw 52b presses the rod to the block 52a, and the head unit 1 is secured to the drum stand.

The bottom portion 41b is partially depressed, and the connector 54 is exposed to the recess. The piezoelectric transducer 10 is connected to a lead wire, and the rim shot switches 11/12 are connected to another lead wire. These lead wires are terminated at the connector 54, and the stereocable 3 has a jack insertable into the connector 54. When the jack is inserted into the connector 54, the piezoelectric transducer 10 and rim shot switches 11/12 are electrically connected to the signal processing system 2.

Figure 7A:
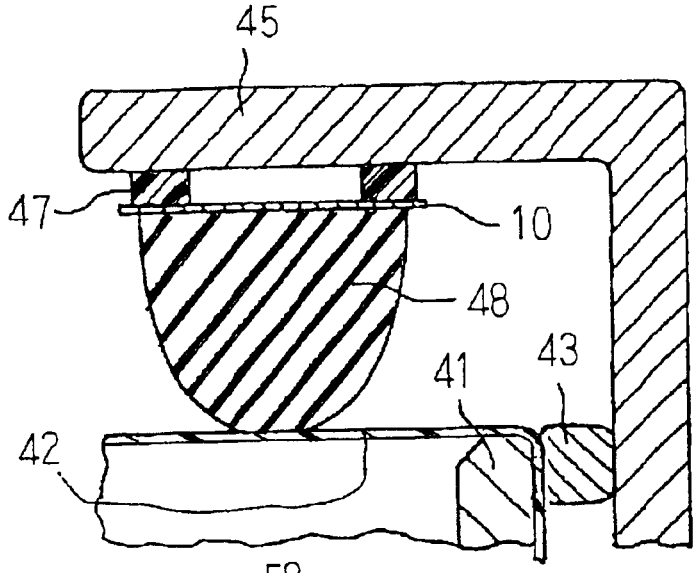
FIGS. 7A to 7C are cross sectional views showing different structures of a sensor holder incorporated in the electronic drum.
Figure 7B:
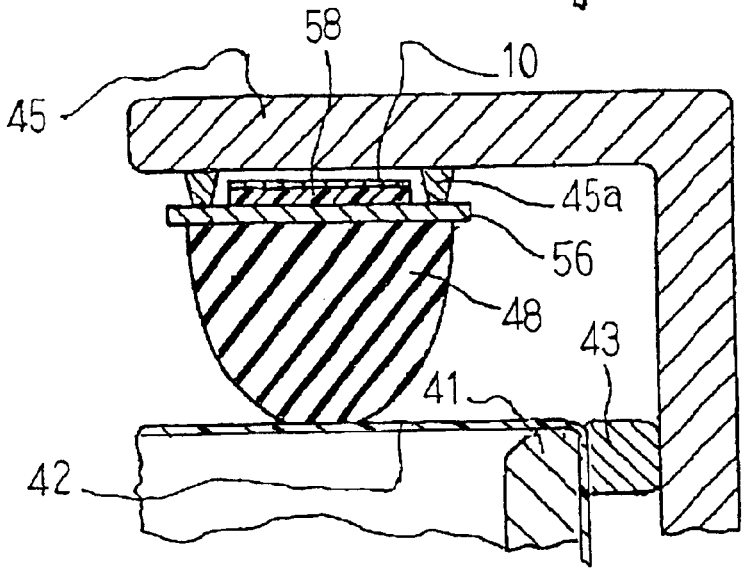

The sensor holder 45, piezoelectric transducer 10, pieces of vibration absorbing adhesive compound 47 and vibration absorber 48 are hereinbelow described in more detail with reference to FIGS. 7A to 7C. As described hereinbefore, the piezoelectric transducer 10 is adhered to the lower surface of the sensor holder 45 by means of the pieces of vibration absorbing adhesive compound 47, and the vibration absorber 48 is fixed to the lower surface of the piezoelectric transducer 10 in such a manner that the vibration absorber 48 is held in contact with the head 42 at the lower end thereof (see FIG. 7A).

Assuming now that a drummer beats the head unit 1, while the drummer is giving the pad shots onto the head 42, the head vibrates, and the vibrations are propagated through the vibration absorber 48 to the piezoelectric transducer 10. The vibration absorber 48 rapidly decays the vibrations. The piezoelectric transducer 10 converts the vibrations to the analog signal. Thus, the analog signal is representative of the vibrations generated at each shot so that the central processing unit 24 can accurately determine the intensity of each pad shot and a time at which the drummer gives the pad shot.

When the drummer gives the rim shots, the associated rim shot switch 11 or 12 turns on, and changes the potential level at the input node of the sticking discriminator 21. The rim shots give rise to vibrations of the rim 44, and the vibrations are propagated through the outer ring 43 to the sensor holder 45. The vibrations are rapidly absorbed by the pieces of vibration absorbing adhesive compound 47, and the vibrations, which represents each rim shot, reach the piezoelectric transducer 10. The piezoelectric transducer 10 converts the vibrations to the analog signal, and the central processing unit 24 also accurately determines the intensity of each rim shot and a time at which the drummer gives each rim shot. Thus, the pieces of vibration absorbing adhesive compound 47 and vibration absorber 48 propagate rapidly decay vibrations, which accurately represents the intensity and the timing at each shot, to the piezoelectric transducer 10.

The piezoelectric transducer 10 may be supported by the sensor holder 45 in different manners. FIG. 7B shows another supporting structure. The sensor holder 45 has projections 45a. The projections 45a are formed on the lower surface of the sensor holder 45, and are downwardly directed. A sensor plate 56 is fixed to the projections 45a, and is hung from the sensor holder 45. The vibration absorber 48 is fixed to the lower surface of the sensor plate 56, and a vibration absorber 58 is fixed to the upper surface of the sensor plate 56. The vibration absorber 58 is made of vibration absorbing adhesive compound such as, for example, butyl rubber. The piezoelectric transducer 10 is mounted on the vibration absorber 58 so that the vibrations exactly representing the vibrations at each shot reach the piezoelectric transducer 10.

While a drummer is giving the pad shots onto the head 42, the head 42 vibrates, and the vibrations are propagated through the vibration absorber 48, the sensor plate 56 and the other vibration absorber 58 to the piezoelectric transducer 10. The vibration absorbers 48/58 rapidly decays the vibrations so that the vibrations exactly representing a single shot reach the piezoelectric transducer 10.

When the drummer gives the rim shots, the associated rim shot switch 11 or 12 turns on, and changes the potential level at the input node of the sticking discriminator 21. The rim shots give rise to vibrations of the rim 44, and the vibrations are propagated through the outer ring 43, sensor holder 45, projections 45a, sensor plate 56 and vibration absorber 58 to the piezoelectric transducer 10. The vibrations are rapidly decayed by means of the vibration absorber 58, and the vibrations, which exactly represent a single shot, reach the piezoelectric transducer 10. Thus, the vibration absorbers 48/58 are conducive to the accurate determination of the intensity and the timing of each shot.

Figure 7C:
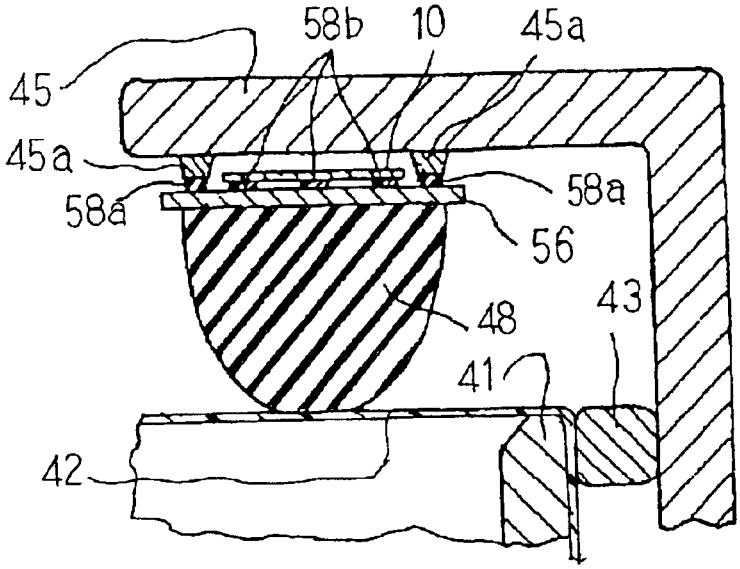

FIG. 7C shows yet another supporting structure. The sensor holder 45 also has the projections 45a. The sensor plate 56 is hung from the projections 45a, and a vibration absorber 58a is inserted between the projections 45a and the sensor plate 56. The vibration absorber 48 is fixed to the lower surface of the sensor plate 56, and a vibration absorber 58b is fixed to the upper surface of the sensor plate 56. The vibration absorbers 58a/58b are made of vibration absorbing adhesive compound such as, for example, butyl rubber. The piezoelectric transducer 10 is mounted on the vibration absorber 58b so that the vibrations are rapidly decayed by mean of the vibration absorbers 48/58a/58b.

While a drummer is giving the pad shots onto the head 42, the head 42 vibrates, and the vibrations are propagated through the vibration absorber 48, the sensor plate 56 and the other vibration absorber 58b to the piezoelectric transducer 10. The vibration absorbers 48/58b rapidly decay the vibrations so that the vibrations exactly representing a single shot reach the piezoelectric transducer 10.

When the drummer gives the rim shots, the associated rim shot switch 11 or 12 turns on, and changes the potential level at the input node of the sticking discriminator 21. The rim shots give rise to vibrations of the rim 44, and the vibrations are propagated through the outer ring 43, sensor holder 45, projections 45a, vibration absorber 58a, sensor plate 56 and vibration absorber 58b to the piezoelectric transducer 10. The vibrations are rapidly decayed by means of the vibration absorbers 58a/58b, and the vibrations exactly representing a single shot reach the piezoelectric transducer 10. Thus, the vibration absorbers 48/58a/58b are conducive to the accurate determination of the intensity and the timing of each shot.

As will be understood from the foregoing description, the head unit 1 is equipped with two rim shot switches 11/12, and the two rim shot switches 11/12 change the potential level at the input node of the sticking discriminator 21 depending upon the three sorts of sticking, i.e., the open rim shot, close rim shot and pad shot. Nevertheless, only two conductive lines are required for the three sensors 10/11/12, and the head unit 1 is conducive to the simplification of the electronic drum.

Moreover, the vibration absorbers 47/48/58/58a/58b are provided in association with the piezoelectric transducer 10. Those vibration absorbers 47/48/58/58a/58b makes the vibrations rapidly decayed. The vibrations, which exactly represents each shot, reach the piezoelectric transducer 10. The piezoelectric transducer 10 stores the pieces of data information required for the determination in the analog signal so that the signal processing system 2 can exactly produces the drum sound.

Signal Processing System

Figure 8:
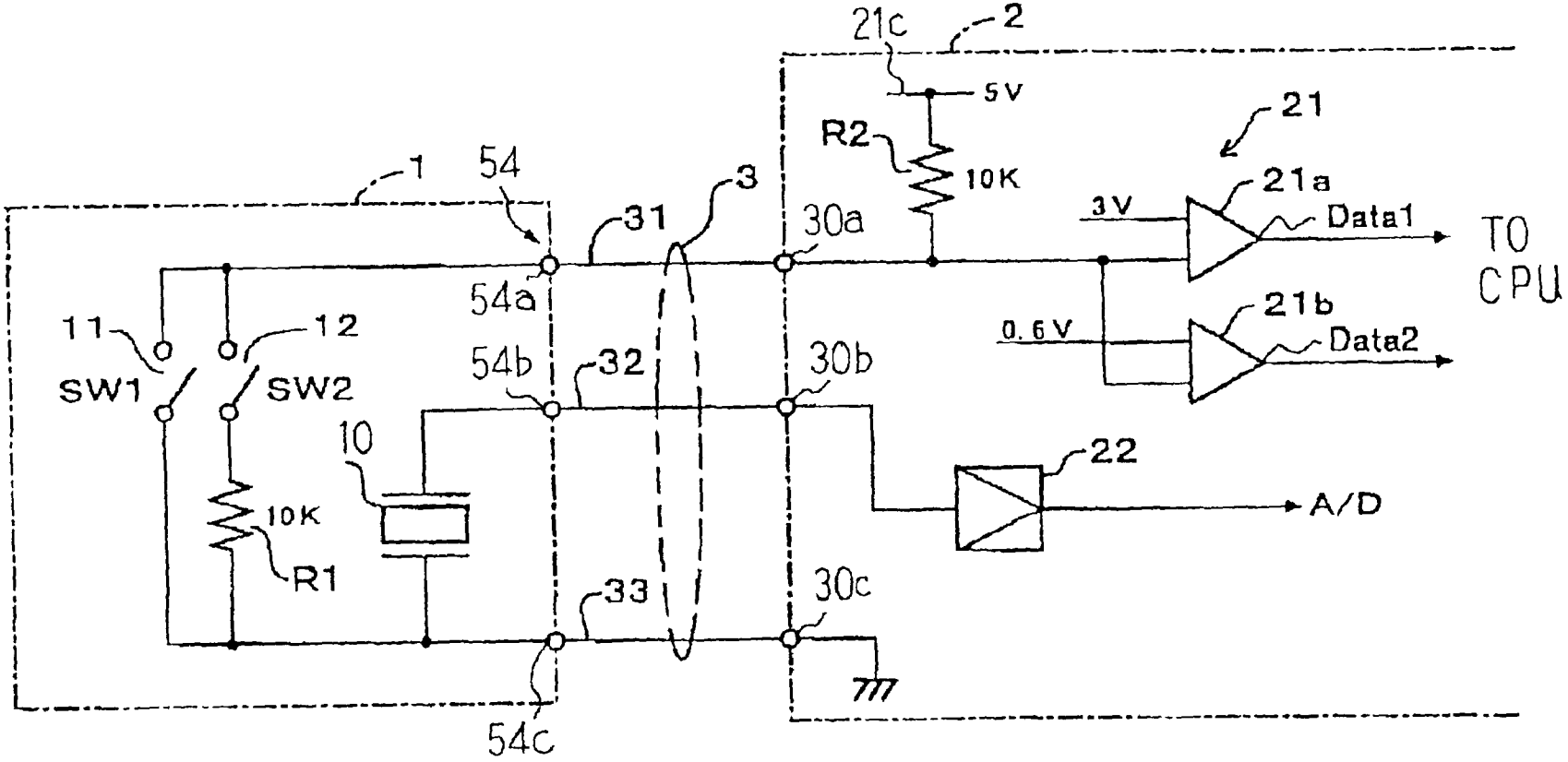
FIG. 8 is a circuit diagram showing the circuit configuration of a sticking discriminator and other component circuits of a signal processing system incorporated in the electronic drum.

FIG. 8 shows an essential portion of the signal processing system 2. The rim shot switches 11 and 12 are abbreviated as "SW1" and "SW2" in FIG. 8. The connector 54 has two signal terminals 54a/54b and a ground terminal 54c, and the signal processing system 2 also has two signal terminals 30a/30b and a ground terminal 30c. The signal terminals 54a/54b are connected to the signal terminals 30a/30b through the conductive lines 31/32, respectively, and the ground terminal 54c is connected through the shield line 33 to the ground terminal 30c, which in turn is connected to the ground.

The rim shot switch 11 is connected between the signal terminal 54a and the ground terminal, and a series combination of the other rim shot switch 12 and a resistor element R1 is connected between the signal terminal 54a and the ground terminal 54c in parallel to the rim shot switch 11. In this instance, the resistor element R1 offers 10 kilo-ohms against electric current flowing through the series combination. For this reason, the amount of current passing through the rim shot switch 11 is larger than the amount of current passing through the series combination of the rim shot switch 12 and resistor element R1.

The piezoelectric transducer 10 is connected between the other signal terminal 54b and the ground terminal 54c, and the signal terminal 54b is connected through the conductive line 32 to the signal terminal 30b, which in turn is connected to the envelope extractor 22.

The sticking discriminator 21 includes two comparators 21a/21b and a resistor element R2. The two comparators 21a/21b have respective signal input nodes connected in parallel to the signal terminal 30a, reference voltages, which are different from each other, are supplied to the other input nodes of the comparators 21a/21b, respectively. In this instance, the reference voltages are 3 volts to the comparator 21a and 0.6 volt to the comparator 0.6 volt. A power supply line 21c is connected through a resistor element R2 to the signal input nodes of the comparators 21a/21b and the signal terminal 30a. In this instance, the potential level on the power supply line 21c is 5 volts, and the resistor element R2 offers 10 kilo-ohms against the current flowing therethrough. The resistor elements R1/R2 may have different values from 10 kilo-ohms in so far as the resistor elements R1/R2 change the potential level at the input nodes of the comparators 21a/21b between the on-state of the rim shot switch 11 and the on-state of the other rim shot switch 12.

While the vibrations are being converted to the analog signal through the piezoelectric transducer 10, the envelope extractor 22 determines the envelope of the waveform, and supplies the analog envelope signal to the analog-to-digital converter 23. The central processing unit 24 processes the digital envelop signal, and determines the intensity of the shot and timing at which the drummer gives the shot as described hereinbefore.

The sticking discriminator 21 determines the sort of sticking, and produces the 2-bit detecting signal representative of the sort of sticking as follows. While the drummer is beating the head 42, the rim shot switches 11/12 remain off, and any current does not flow from the power supply line 21c to the ground. The power supply line 21c applies 5 volts to the signal input nodes of the comparators 21a/21b. The comparators 21a/21b compare the potential level at the signal input nodes, i.e., 5 volts with the reference voltages 3 volts and 0.6 volt, and decide that the input potential level is higher than the reference voltages. For this reason, the comparators 21a/21b keep the output nodes "Data1" and "Data2" in a high level or logic "1" level. The 2-bit detecting signal is expressed as "11", and is supplied to the signal port of the central processing unit 24. In this situation, the central processing unit 24 gives the tone color parameter representative of the pad shot to the music data code.

The drummer is assumed to give the open rim shot onto the rim cushion 46. The rim shot switch 12 turns on, and the current flows through the rim shot switch 12 and resistor element R1 to the ground. The potential level at the signal input nodes is regulated to 2.5 volts due to the series of resistor elements R2/R1. Although the signal input node of the comparator 21a is lower than the reference voltage of 3 volts, the other signal input node exceeds the reference voltage of 0.6 volt. The comparator 21b keeps the output node "Data2" in logic "1" level. However, the other comparator 21a changes the output node "Data1" to logic "0" level. Thus, the close rim shot is expressed by the 2-bit detecting signal of "01". In this situation, the central processing unit 24 gives the tone color parameter representative of the open rim shot to the music data code.

When the drummer gives the close rim shot onto the rim cushion 46, the rim shot switch 11 turns on, but the other rim shot switch 12 remains off. The current flows from the power supply line 21c through the rim shot switch 11 to the ground, and the potential level at the input nodes are decayed to the ground level. The potential level at both input nodes becomes lower than the two reference voltages 3 volts and 0.6 volt. Then, both comparators 21a/21b change the output nodes "Data1" and "Data2" to logic "0" level. Thus, the close rim shot is expressed by the 2-bit detecting signal of "00", and the central processing unit 24 gives the tone color parameter representative of the close rim shot to the music data code.

In case where the drummer concurrently strikes both rim shot switches 11/12, the drummer is assumed to intend the close rim shot. When both rim shot switches 11/12 turn on, the current flows through the rim shot switch 11 to the ground, and the potential level at the input nodes of the comparators 21a/21b is decayed to the ground level. The comparators 21a/21b change the output nodes "Data1" and "Data2" to logic "0" level, and the central processing unit 24 gives the tone color parameter representative of the close rim shot to the music data code.

The relation between the state of the rim shot switches 11/12 and the tone color parameter is tabled as follows.

TABLE 1

| | Rim Shot Switch | | Comparator | | Tone Color |
|---|---|---|---|---|---|
| STATE | SW1 | 5W2 | Data1 | Data2 | Parameter |
| 1 | OFF | OFF | "1" | "1" | Pad Shot |
| 2 | OFF | ON | "0" | "1" | Open Rim Shot |
| 3 | ON | OFF | "0" | "0" | Close Rim Shot |
| 4 | ON | ON | "0" | "0" | Close Rim Shot |

While the signal processing system 2 is working, the central processing unit 24 periodically branches from a main routine into a sub-routine through a timer interruption, and discriminates the two sorts of rim shots in the subroutine. As to the pad shots, the central processing unit 24 periodically checks the signal port assigned to the digital envelope signal in the main routine to see whether or not the piezoelectric transducer 10 detects the vibrations. While the drummer is beating the head 42 or the rim cushion 46, the analog-to-digital converter 23 supplies the digital envelope signal or binary codes equivalent to finite values, i.e., not "zero" to the signal port of the central processing unit 24. If the binary codes are indicative of zero, the central processing unit decides that the drummer beats neither head 42 nor rim cushion 46, and proceeds to the next step of the main routine. In case where the drummer is beating the head 42, the digital envelope signal notifies the central processing unit 24 of the beats through the binary codes of finite values. Then, the central processing unit 24 determines the intensity or velocity of the beats and the note-on timing in the main routine, and produces the music data codes representative of the pad shots. The music data codes are supplied to the tone generator 27 for producing the digital music signal.

Figure 9:
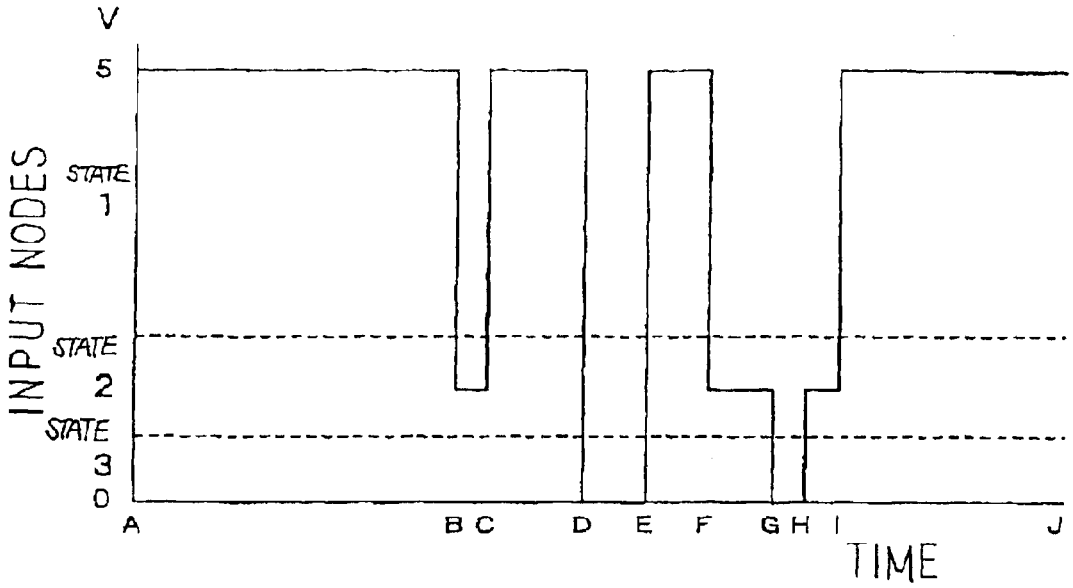
FIG. 9 is a timing chart showing three sorts of sticking on the electronic drum.

Assuming now that a drummer is beating the head 42 and/or the rim cushion 46, the sticking discriminator 21 changes the 2-bit detecting signal as shown in FIG. 9. The drummer gives the pad shots in the time periods A–B, C–D, E–F and I–J, and the 2-bit detecting signal is indicative of state 1, i.e., "11" in these time periods. The drummer changes the sticking to the open rim shot at time B, returns to the pad shots at time C, changes the sticking to the close rim shot at time D, and returns to the pad shorts at time E. Accordingly, the 2-bit detecting signal is indicative of the state 2 in the time period B–C and the state 3 in the time period D-E. The drummer changes the sticking to the open rim shot at time F, and further to the close rim shot at time G. The drummer returns to the open rim shot at time H, and further to the pad shot at time I. Accordingly, the 2-bit detecting signal is indicative of the state 3 in the time period G–H, and the state 2 in the time periods F–G and H–.

Figure 10:
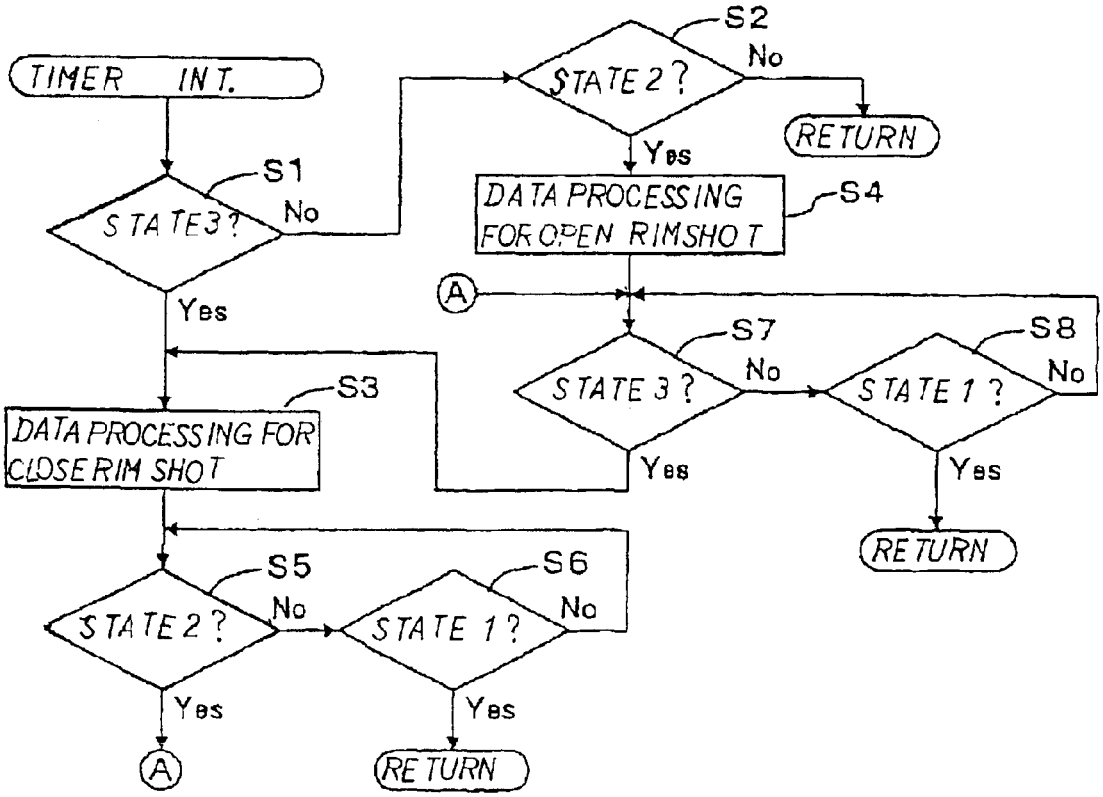
FIG. 10 is a flowchart showing a timer interruption sub-routine executed by a central processing unit for discriminating the open rim shot from the close rim shot.

If the timer interruption takes place during the execution of the main routine in any time period A–B, C–D, E–F or I–J, the central processing unit 24 starts the sub-routine shown in FIG. 10. The central processing unit 24 firstly checks the 2-bit detecting signal to see whether or not the binary number is equal to "00" as by step S1. The 2-bit detecting signal is equal to "11" in those time period A–B, C–D, E–F and I–J so that the answer is given negative. Then, the central processing unit 24 proceeds to step S2, and checks the 2-bit detecting signal, again, to see whether or not the binary number is equal to "01". Then answer is given negative, again. With the negative answers at steps S1 and S2, the central processing unit 24 returns to the main routine.

If the timer interruption takes place in any one of the time periods B-C, F-G and H-I, the central processing unit 24 finds the 2-bit detecting signal to be equal to "01". Although the answer at step S1 is given negative, the answer at step S2 is changed to affirmative. Then, the central processing unit 24 determines that the drummer gives the open rim shot. The central processing unit 24 decides the tone color parameter for the open rim shot, further determines the intensity of the beat and the note-on timing on the basis of the binary codes of the digital envelope signal, and produces the music data codes representative of the open rim shot as by step S4. Upon completion of the jobs at step S4, the central processing unit checks the 2-bit detecting signal to see whether or not the sticking discriminator 21 changes the 2-bit detecting signal as by steps S7 and S8. While the drummer is giving the open rim shots, the answers at steps S7 and S8 are give negative, and the central processing unit 24 reiterates the loop consisting of steps S7 and S8. When the drummer changes the sticking to the pad shot, the answer at step S8 is given affirmative, and the central processing unit 24 returns to the main routine.

However, if the drummer changes the sticking from the open rim shot to the close rim shot (see time G), the central processing unit 24 proceeds to step S3. In case where the drummer changes the sticking from the pad shots to the close rim shot (see time D), the central processing unit 24 proceeds to step S3 with the positive answer at step S1.

In step S3, the central processing unit decides the tone color parameter for the close rim shot, and determines the intensity of the beat and the note-on timing on the basis of the binary codes of the digital envelope signal. The central processing unit 24 produces the music data codes, and supplies them to the tone generator 27. Upon completion of the jobs at step S3, the central processing unit 24 checks the 2-bit detecting signal to see whether or not the drummer changes the sticking to the open rim shot or the pad shot as by step S5 and S6. While the drummer is continuing the close rim shot, the answers at step S5 and S6 are given negative, and the central processing unit 24 reiterates the loop consisting of steps S5 and S6.

When the drummer changes the sticking from the close rim shot to the open rim shot (see time H), the answer at step S5 is changed to affirmative, and the central processing unit 24 proceeds to step S7. The central processing unit 24 returns to the main routine through the steps S7 and S8. When the central processing unit 24 enters the sub-routine, again, the central processing unit 24 proceeds to the step S4 through the steps S1 and S2, and changes the timbre to the open rim shot. On the other hand, when the drummer changes the sticking to the pad shots (see time E), the central processing unit 24 returns to the main routine with the positive answer at step S6.

As will be appreciated from the foregoing description, the signal processing system 2 discriminates the three sorts of sticking, i.e., the pad shot, open rim shot and close rim shot, from one another by means of the sticking discriminator 21. This means that the sensors 10/11/12 can supply the output signals to the signal processing system 2 through the conductive lines 31/32 smaller in number than the sensors 10/11/12. Thus, the sticking discriminator 21 makes the system configuration of the electronic drum according to the present invention simpler than that of the prior art electronic drum.

As described hereinbefore, the head unit 1 is corresponding to the player's console, and the piezoelectric transducer 10, rim shot switches 11/12 and resistor element R1 as a whole constitute the plural interfaces. The head 42, rim cushion 46 and rim 44 serve as the plural vibratory members. The piezoelectric transducer 10 is further corresponding to the first converter, and the rim shot switches 11/12 and resistor R1 further serve as the second converters. The envelope extractor 22, analog-to-digital converter 23, central processing unit 24, ROM 25, RAM 26, tone generator 27, waveform memory 28 and the digital-to-analog converter 29 as a whole constitute an information processing unit.

Second Embodiment

Turning to FIGS. 11 to 14 of the drawings, another electronic drum embodying the present invention largely comprises a head unit 1A, a data processing system 2A and a stereocable 3A. The electronic drum is corresponding to an acoustic snare drum, and the head unit 1A serves as the player's console. As will be hereinafter described in detail, head unit 1A is equipped with a quasi-tension controller 57 as well as plural sensors 10A/11A/12A, and a sticking/quasi-tension discriminator 21A is incorporated in the signal processing system 2A. For this reason, the quasi-tension controller 57 and plural sensors 10A/11A/12A supply their output signals to the signal processing system 2A through signal lines 31/32 smaller in number than the signal sources, i.e., the quasi-tension controller 57 and sensors 10A/11A/12A. Thus, the electronic drum implementing the second embodiment is also simpler than the prior art electronic drum. The plural sensors 10A/11A/12A, the quasi-tension controller 57 and associated resistors as a whole constitute the plural interfaces.

Head Unit 1A

Figure 11:
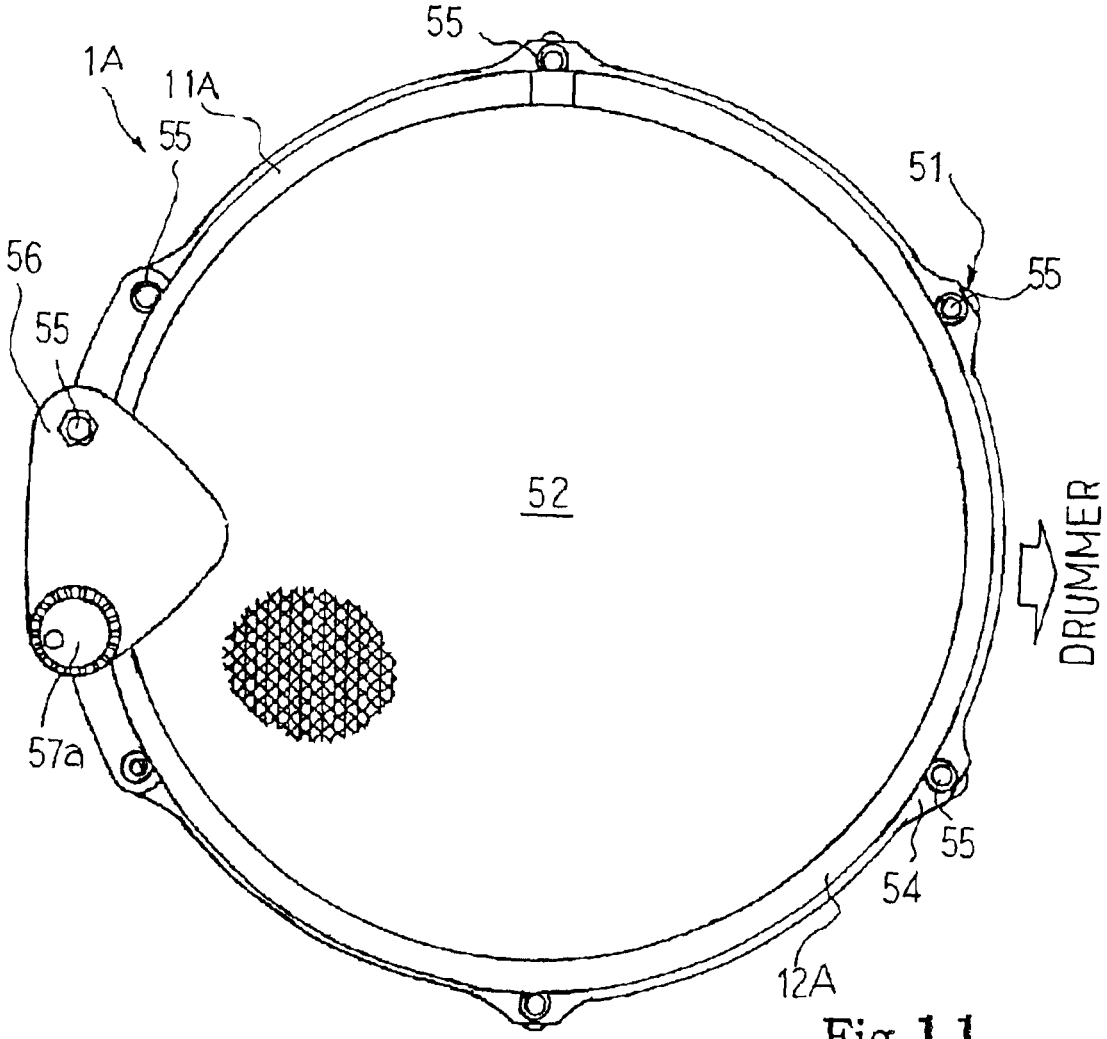
FIG. 11 is a plane view showing another electronic drum according to the present invention.
Figure 12:
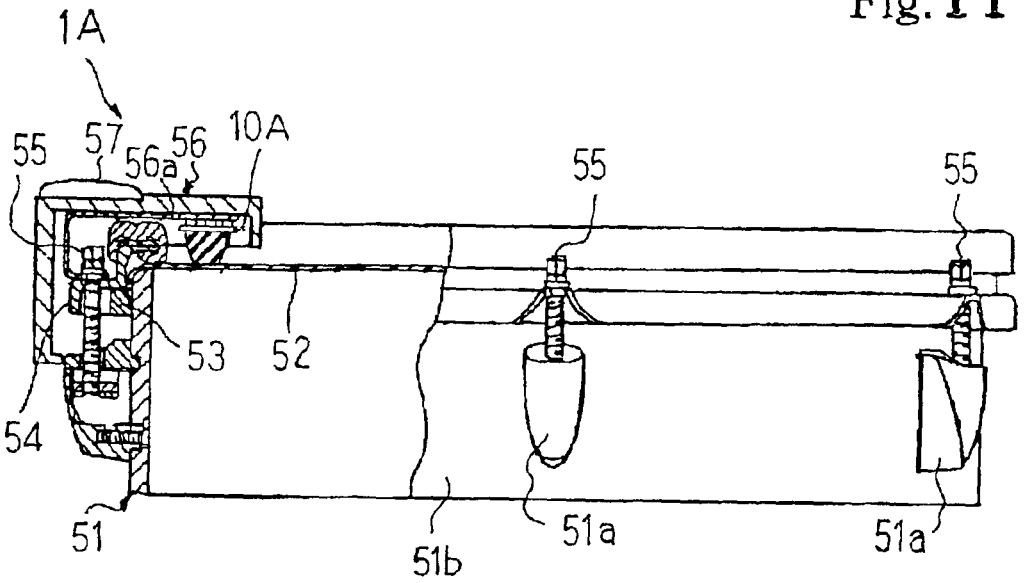
FIG. 12 is a partially cut-away cross sectional view showing a cross section of the electronic drum.
Figure 13:
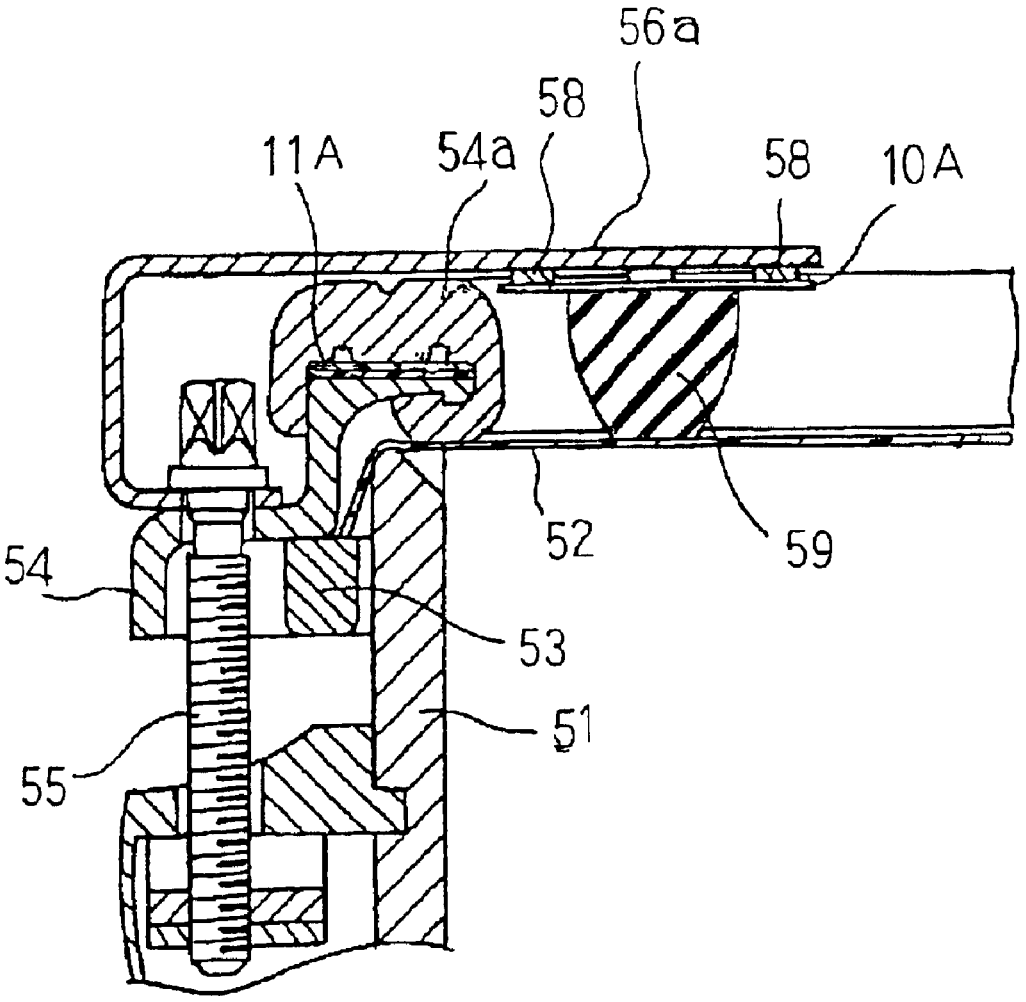
FIG. 13 is a cross sectional view showing sensors incorporated in the electronic drum.

Referring to FIGS. 11 to 13, the head unit 1A has a contour like an acoustic snare drum, and comprises a shell 51, a head 52, an outer ring 53, a rim 54, a rim cushion 54a and set screws 55. The shell 51 is cylindrical, and has brackets 51a and a shell body 52b. The brackets 51a are fixed to the shell body 51b at regular intervals, and female screws are formed in the brackets 51a. The upper opening is closed with the head 52, and the outer ring 53 is connected to the periphery of the head 52. The rim 54 is formed with through-holes, which are aligned with the female screws. The set screws 55 pass through the through-holes, and are screwed into the female screws. Then, the rim 54 exerts force on the outer ring 53, and the outer ring 53 makes the head 52 stretched over the upper opening of the shell 51. The rim 54 is capped with the rim cushion 54a.

The head unit 1A further comprises rim shot switches 11A/12A, a sensor holder 56, a variable resistor 57 serving as the quasi-tension control, pieces of vibration absorbing adhesive compound 58, a vibration absorber 59 and a piezoelectric transducer 10A. The rim shot switches 11A/12A are provided on the rim 54, and are covered with the rim cushion 54a. The rim shot switches 11A/12A are implemented by film switches, and are the normally-off type. The rim shot switch 12A is closer to a drummer than the other rim shot switch 11A. The rim shot switch 12A occupies three quarters of the upper surface of the rim 54, and the other rim shot switch 11A occupies the remaining area, i.e., almost a quarter of the upper surface. Drummers give the open rim shots to the head unit 1A more frequently than the close rim shots. The wide rim shot switch 12A withstands the frequently given shots.

When a drummer gives the open rim shots onto the rim cushion 54a, the rim shot switch 12A turns on. On the other hand, when the drummer gives the close rim shots onto the rim cushion 54a, the other rim shot switch 11A turns on.

The sensor holder 56 has a rigid circuit board 56a, and the rigid circuit board 56a is fixed to the lower surface of the sensor holder 56. The rigid circuit board 56a is fixed to the shell 51 together with the rim 54. The rigid circuit board 56a is fixed to the lower surface of the sensor holder 56. The sensor holder 56 vertically rises, and horizontally extends over the head 52. The variable resistor 57 is mounted on the rigid circuit board 56a, and has a dial 57a exposed to the space over the sensor holder 56. The dial 57a is turnable, and a drummer varies the timbre of drum sound by turning the dial 57a. The dial 57a is corresponding to a snare tension controller of the acoustic snare drum, and varies the timbre of the drum sound to be produced as if the drummer manipulates the snare tension controller of the acoustic snare drum.

The piezoelectric transducer 10A is fixed to the lower surface of the rigid circuit board 56a by means of the pieces of vibration absorbing adhesive compound 58, and the vibration absorber 59 is fixed to the lower surface of the piezoelectric transducer 10A. In this instance, the vibration absorbing adhesive compound 58 is butyl rubber, and the vibration absorber 59 is made of rubber or urethane sponge. The vibration absorber 59 is hung from the piezoelectric transducer 10A, and the lower end of the vibration absorber 59 is held in contact with the head 52. The variable resistor 57 and rim shot switches 11A/12A are electrically connected in parallel to a connector (not shown).

A drummer is assumed to beats the head unit 1A. While the drummer is beating the head 52, the beats give rise to vibrations of the head 52, and the vibrations are propagated through the vibration absorber 59 to the piezoelectric transducer 10A. While the vibrations are being propagated to the piezoelectric transducer 10A, the vibration absorber 59 makes the vibrations rapidly decayed, and supplies the vibrations, which exactly represent the intensity of each shot, to the piezoelectric transducer 10A.

When the drummer gives the rim shots, i.e., the open rim shots and close rim shots, onto the rim cushion 54a, the rim shot gives rise to vibrations of the rim 54, and the vibrations are propagated to the rim shot switch 11A or 12A and the piezoelectric transducer 10A through the sensor holder 56 and the pieces of vibration absorbing adhesive compound 58. The rim shot switch 11A or 12A turns on, and the piezoelectric transducer 10A produces the output signal representative of the intensity of the vibrations. The pieces of vibration absorbing adhesive compound 58 also make the vibrations rapidly decayed.

The variable resistor 57 and rim shot switches 11A/12A are connected to the signal processing system 2A through a single conductive line 31. This results in a simple system configuration of the electronic drum implementing the present invention.

Signal Processing System 2A

Figure 14:
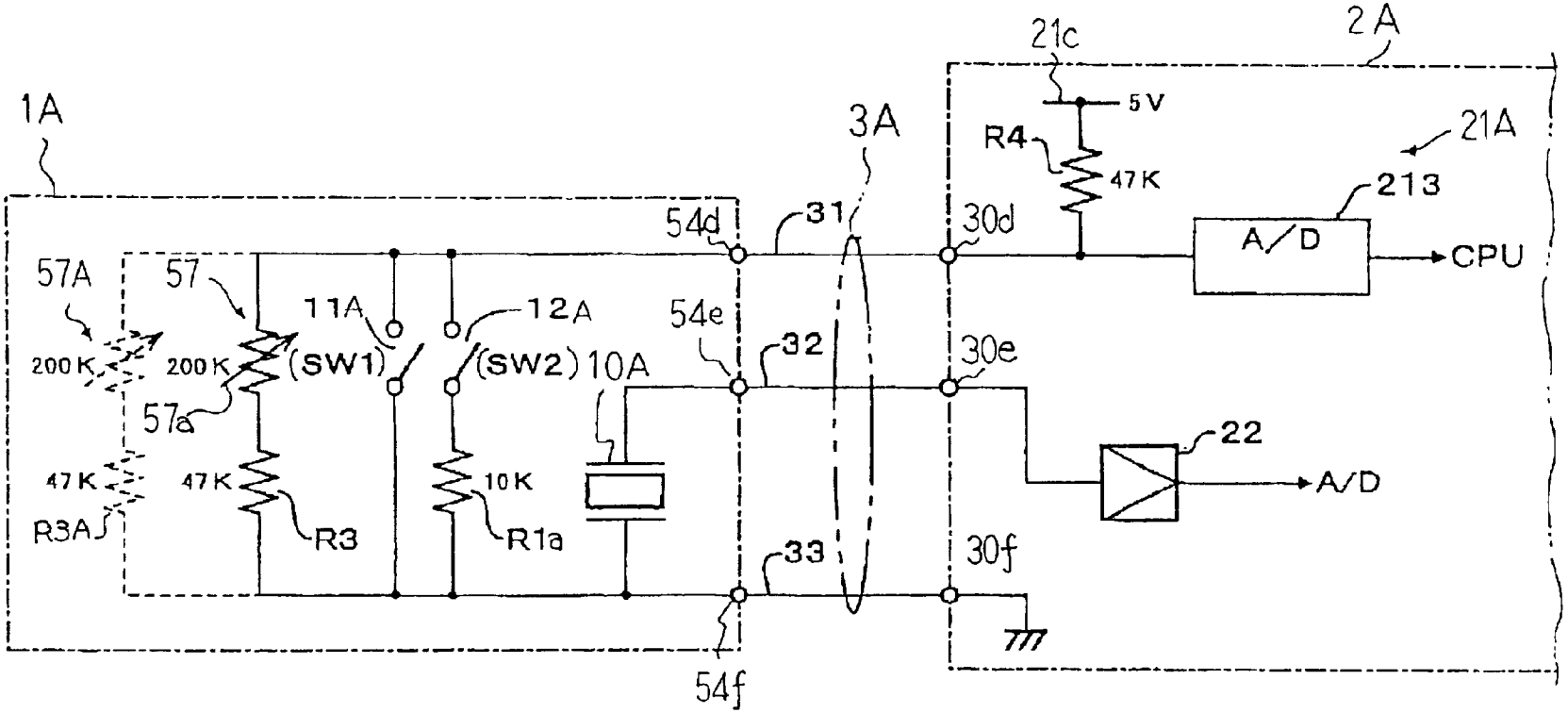
FIG. 14 is a diagram showing the system configuration of the electronic drum according to the present invention.

Referring to FIG. 14, the head unit 1A has three terminals 54d, 54e and 54f, and the signal processing system 2A also has three terminals 30d, 30e and 30f. The stereocable 3A has three conductive lines 31, 32 and 33, which are connected between the three terminals 54d/54e/54f and the corresponding terminals 30d/30e/30f, respectively. In this instance, the resistor elements R3 and R1a offer 47 kilo-ohms and 10 kilo-ohms to the electric current passing therethrough. The rim shot switch 11A, a series combination of the variable resistor 57 and a resistor element R3 and another series combination of the rim shot switch 12A and a resistor element R1a are connected in parallel to one another between the terminals 54d and 54f, and the piezoelectric transducer 10A is connected between the terminals 54e and 54f The terminal 54f is connected through the conductive line 33 to the ground. Thus, only one conductive line 31 is shared between the rim shot switch 11A, rim shot switch 12A and the variable resistor 57.

The signal processing system 2A is similar to the signal processing system 2 except for the sticking/quasi-tension discriminator 21A. For this reason, the other system components are labeled with references same as those designating corresponding system components of the signal processing system 2 without detailed description.

The sticking/quasi-tension discriminator 21A includes a resistor element R4 and an analog-to-digital converter 213. The resistor element R4 is connected between the positive power supply line 21c and the signal terminal 30d. The analog-to-digital converter 213 has an input node connected to the signal terminal 30d so that the potential level at the signal terminal 30d is converted to a digital detecting signal representative of the sort of sticking. The digital detecting signal is supplied from the analog-to-digital converter 213 to the central processing unit 24.

While a drummer is beating the head 52, the rim shot switches 11A/12A remain off, and the current flows only through the resistor R4 and the series combination of the variable resistor 57 and the resistor element R3 to the ground. The potential level at the signal terminal 30d is given by a proportional distribution on the positive potential level between the resistance of the resistor R4 and the total resistance of the series combination of the variable resistor 57 and the resistor element R3. The analog-to-digital converter 213 produces the digital detecting signal representative of a certain binary number. The central processing unit 24 determines the timbre of drum sound at the pad shots depending upon the certain value. If a drummer turns the dial 57a, the variable resistor 57 varies the resistance, and the analog-to-digital converter 213 changes the digital detecting signal from the certain binary number to another certain binary number. The central processing unit 24 acknowledges the drummer's intention, and varies the timbre for the drum sound at the pad shots.

When the drummer gives the open rim shot onto the rim cushion 54a, the rim shot switch 12A turns on, and the current flow through the series combination of the rim shot switch 12A and the resistor element R1a as well as the series combination of the variable resistor 57 and the resistor element R3. Then, the resistance between the terminals 54d and 54f is reduced rather than the resistance in the pad shots. Accordingly, the potential level at the signal terminal 54d is lowered, and the analog-to-digital converter 213 changes the digital detecting signal to another binary number less than the certain binary number. Although the potential level at the signal terminal 54d is varied together with the resistance of the variable resistor 57, the total resistance of the series combination of the variable resistor 57 and the resistor element R3 is much greater than the resistance of the resistor element R1a, and the variance due to the manipulation on the variable resistor 57 is small in value. For this reason, the central processing unit 24 surely discriminates the rim shots from the pad shots.

When the drummer gives the close rim shot onto the rim cushion 54a, the other rim shot switch 11A turns on, and the ground line is connected through the rim shot switch 11A to the input node of the analog-to-digital converter 213. For this reason, the analog-to-digital converter 213 changes the digital detecting signal to yet another binary number less than the binary number in the open rim shots.

Figure 15:
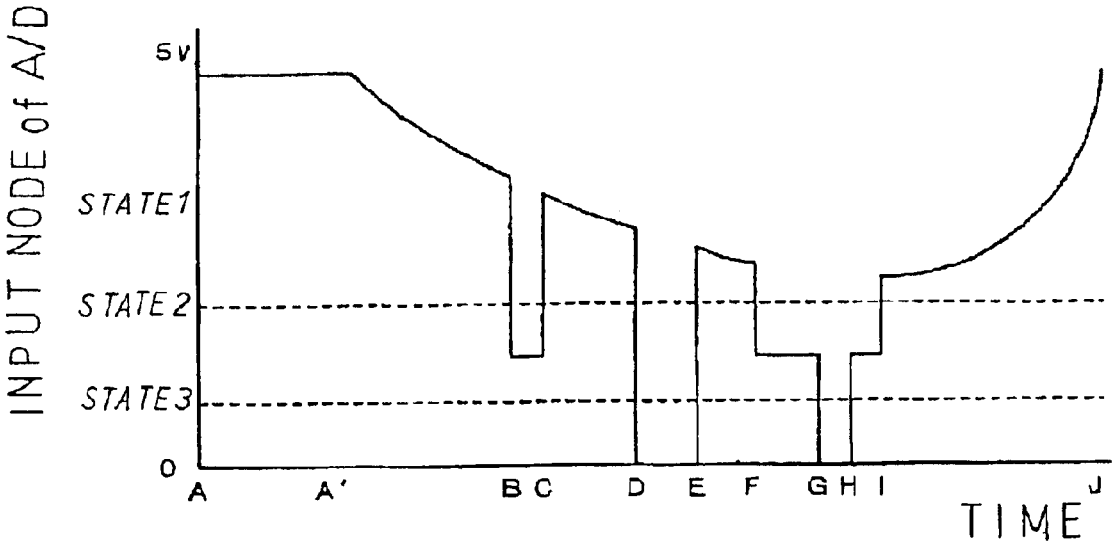
FIG. 15 is a timing chart showing three sorts of sticking on the electronic drum and volume control.

FIG. 15 shows the sticking on the head unit 1A. A drummer is continuously manipulates the quasi-tension controller 57 between time A' and time J, and gives three sorts of shots to the head unit 1A. Although the drummer manipulates the quasi-tension controller 57 from the maximum value to the minimum value, the potential level at the input node of the analog-to-digital converter 213 is higher than the potential level at the open rim shot. For this reason, the central processing unit 24 always discriminates the rim shots from the pad shots.

The drummer beats the head 52 in time periods A–B, C–D, E–F and I–J. The central processing unit 24 determines the intensity of beat and the volume at a certain step in a main routine. The drummer gives the open rim shots to the rim cushion 54a and head 52 in the time period B–C, F–G and H–I, and the close rim shots to the rim cushion 54a in the time periods D–E and G–H.

Figure 16:
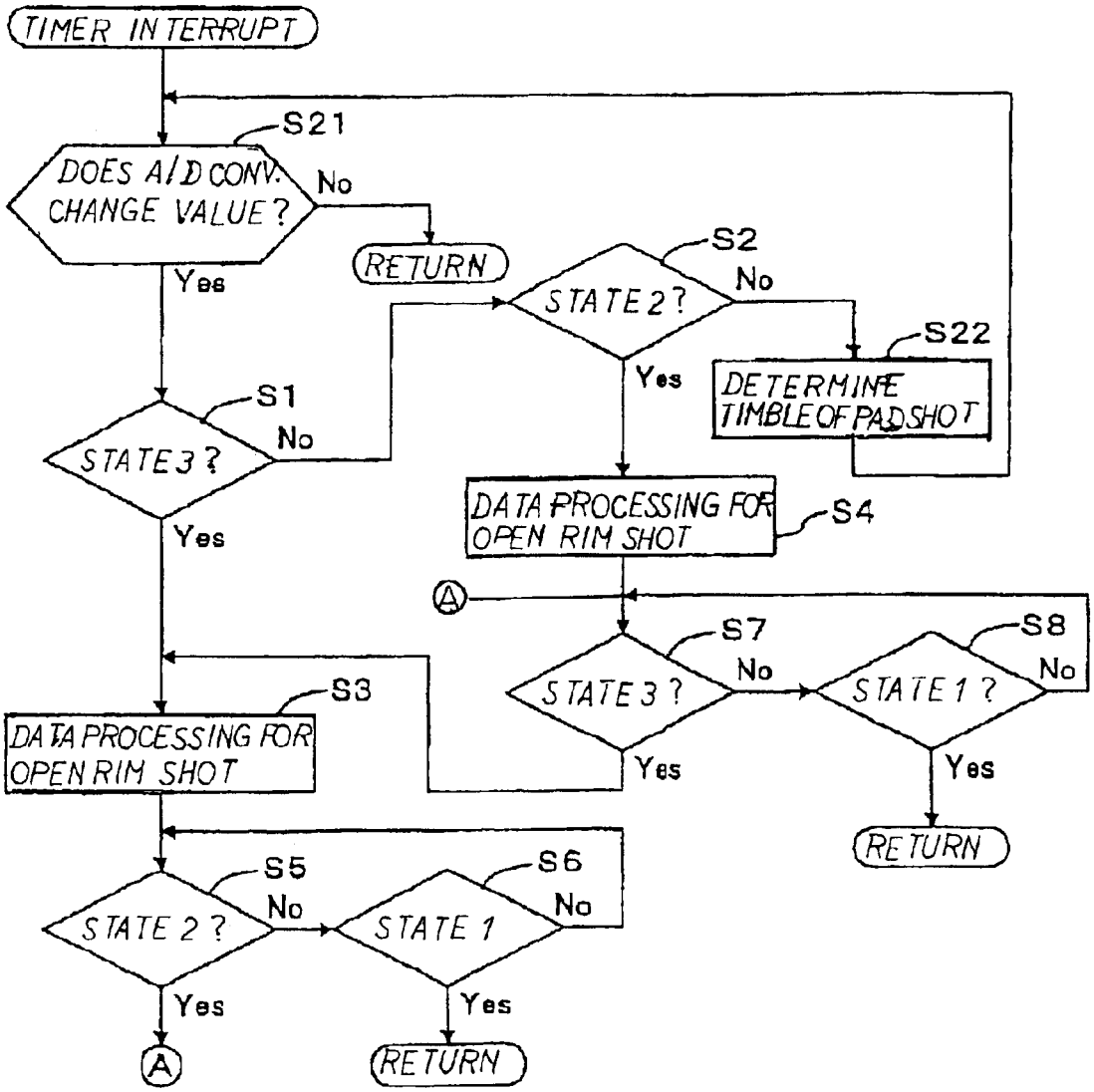
FIG. 16 is a flowchart showing a timer interruption sub-routine executed by a central processing unit for the volume control and the discrimination of the sticking.
Figure 17:
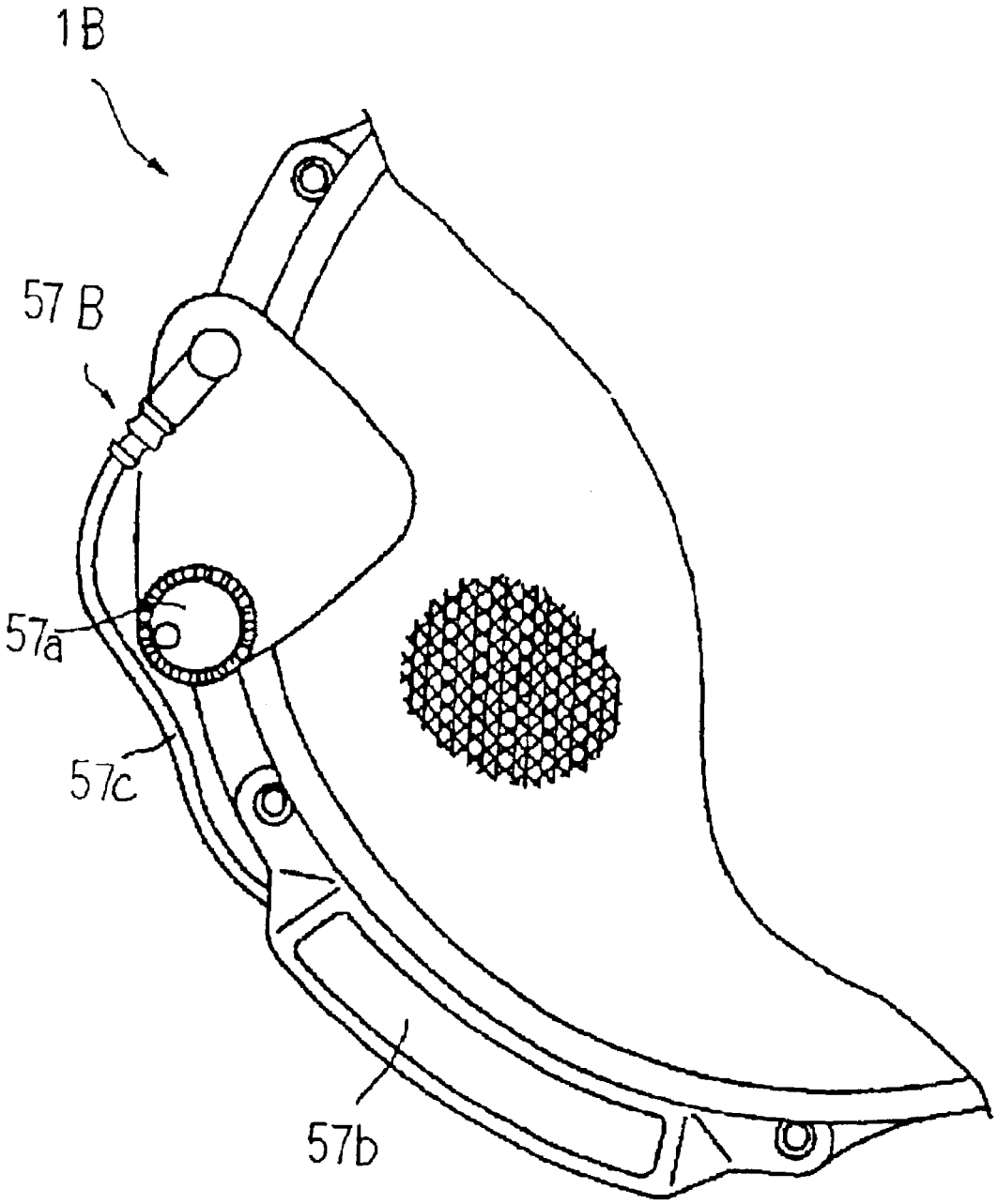
FIG. 17 is a plane view showing essential parts of a modification of the head unit.

FIG. 16 shows a sub-routine executed by the central processing unit 24 at timer interruptions. In case where the jobs at a certain step are same as those at the step in the sub-routine shown in FIG. 10, the certain step is labeled with the reference designating the corresponding step.

When the timer interruption takes place, the central processing unit 24 fetches the digital detecting signal upon entry into the sub-routine, and writes the value of the digital detecting signal in the working memory 26. The central processing unit 24 compares the value of the digital detecting signal with the value of the digital detecting signal at the previous timer interruption to see whether or not the analog-to-digital converter 213 changes the value of the digital detecting signal as by step S21. While the drummer is beating the head 52 in the time period A-A', the analog-to-digital converter 213 keeps the digital detecting signal at the maximum value, and the answer at step S21 is given negative. With the negative answer, the central processing unit 24 returns to the main routine.

When the timer interruption takes place in any one of the time periods A'–B, C–D, E–F and I–J, the answer at step S21 is given affirmative, and the central processing unit 24 checks the digital detecting signal to see whether or not the value is less than the threshold indicative of the state 3 as by step S1 and whether or not the value is fallen within the range between the threshold indicative of the state 3 and the threshold indicative of the state 2 as by step S2. Although the value is varied in the time periods A'–B, C–D, E–F and I–J, the value of the digital detecting signal is greater than the threshold indicative of the state 2, and the answers at the steps S1 and S2 are given negative. Then, the central processing unit 24 determines that the drum sound is to be produced at a certain timbre for the pad shots, and reiterates the loop consisting of the steps S21, S1, S2 and S22. The central processing unit 24 produces the music data codes representative of the certain timbre, intensity of the pad shot and note-on, and supplies the music data codes to the tone generator 27.

When the timer interruption takes place in any one of the time periods D–E and G–H, the answer at step S1 is given affirmative, and the central processing unit 24 changes the timbre from the pad shot to the close rim shot as by step S3. On the other hand, when the timer interruption takes place in any one of the time periods B–C, F–G and H–I, the central processing unit 24 changes the timbre from the pad shot to the open rim shot as by step S4. The jobs at the steps S3, S4 and S5 to S8 are similar to those of the corresponding steps shown in FIG. 10, and detailed description is omitted for avoiding repetition.

As will be understood from the foregoing description, the signal processing system 2A has the sticking/quasi-tension discriminator 21A so that only one conductive line 31 is shared between the volume control 57 and the rim shot switches 11A/12A. This results in the simple system configuration.

It is preferable to provided the quasi-tension controller 57 on the head unit 1A, because the drummer can easily manipulate it in the performance. In case where the quasi-tension controller 57 is prepared separately from the head unit 1A, the drummer may put the quasi-tension controller at the optimum position for him.

Another series combination of a quasi-tension controller 57A and a resistor element R3A may be further connected between the terminals 54d and 54f in parallel to the quasi-tension controller 57 as indicated by broken lines in FIG. 14. The quasi-tension controller 57A may be of the type manipulated by using a foot pedal. In case where a drummer controls the timbre for the pad shots through the quasi-tension controller 57A, the drummer minimizes the resistance of the variable resistor 57, and varies the resistance of the other variable resistor 57A by means of the foot pedal.

Otherwise, a ribbon controller 57b may be provided on the head unit 1B. In this instance, the ribbon controller 57b is connected through a controller connection 57c to a quasi-tension controller 57B corresponding to the quasi-tension controller 57A. The quasi-tension controller 57B is set to the minimum resistance. When a drummer wants to change the timbre for the pad shots, the drummer manipulates the ribbon controller 57b instead of the dial 57a.

Third Embodiment

Figure 18:
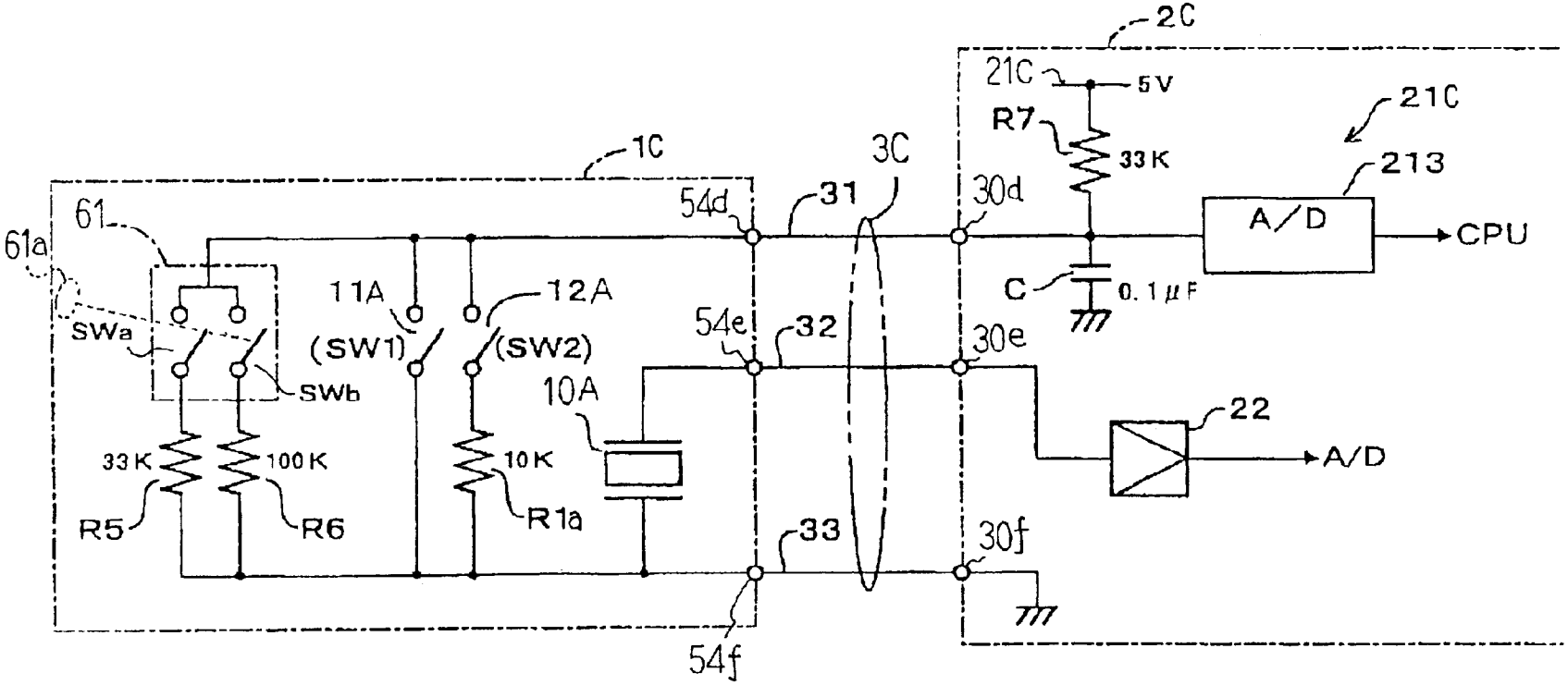
FIG. 18 is a diagram showing the system configuration of yet another electronic drum according to the present invention.

FIG. 18 shows yet another electronic drum embodying the present invention. The electronic drum comprises a head unit 1C, a signal processing system 2C and a stereocable 3C. The head unit 1C serves as the player's console. The head unit 1C is similar to the head unit 1A except a quasi-tension controller 61. Although the quasi-tension controller 57 is implemented by a variable resistor in the second embodiment, a rotary encoder serves as the quasi-tension controller 61 in the third embodiment. The other component parts of the head unit 1C are same as those of the head unit 1A, and are labeled with the references same as those designating corresponding component parts of the head unit 1A without detailed description. The sensors 10A/11A/12A, the rotary encoder 61 and the associated resistors as a whole constitute the plural interfaces.

The stereocable 3C is same as the stereocable 3A, and the signal processing system 2C is similar to the signal processing system 2A except for a sticking/quasi-tension discriminator 21C. The other component parts of the signal processing system 2C are similar to corresponding parts of the signal processing system 2A, and are labeled with the references designating the corresponding component parts without detailed description.

Figure 19A:
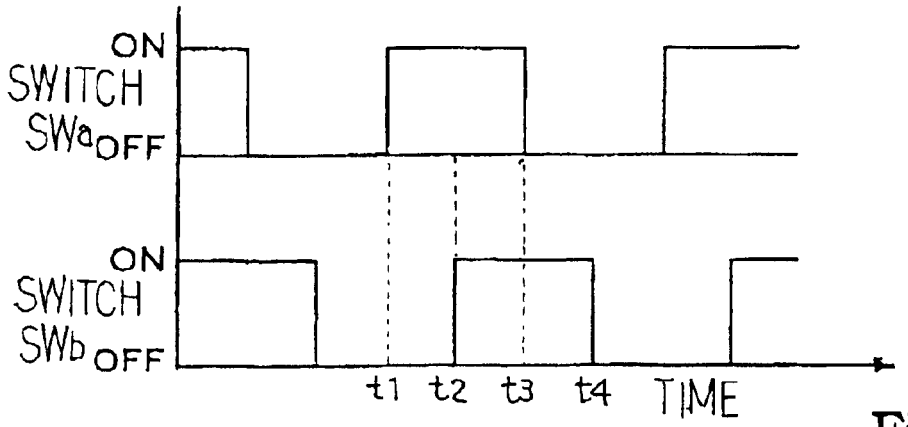
FIGS. 19A and 19B are graphs showing the state of two rotary switches incorporated in a rotary encoder.
Figure 19B:
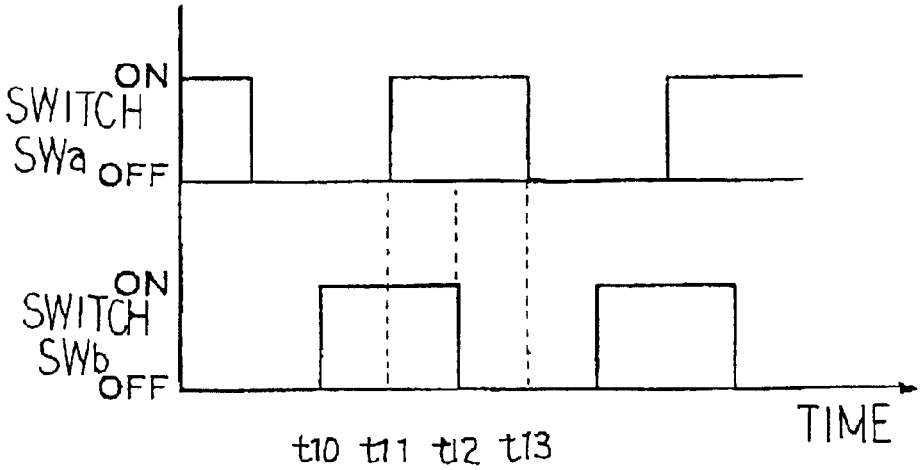

Description is made on the rotary encoder 61 and the sticking/quasi-tension discriminator 21C in more detail. The rotary encoder 61 has a dial 61a and two rotary switches SWa/SWb. The dial is bi-directionally turnable, and is provided for drummers. The dial 61a is linked with the rotary switches SWa/SWb, and changes the rotary switches SWa/SWb between the on-state and the off-state at different angles. While a drummer is rotating the dial in the counter clockwise direction, the rotary switches SWa/SWb are changed between the on-state and the off-state as shown in FIG. 19A. The rotary switch SWa firstly turns on at time t1, but the other rotary switch SWb is still turned off. The rotary switch SWb turns on at time t2, and both of the rotary switches SWa/SWb are turned on between time t2 and time t3. The rotary switch SWa turns off at time t3, and only the rotary switch SWb remains on. The rotary switch SWb turns off at time t4, and both of the rotary switches SWa/SWb remain off. On the other hand, while a drummer is rotating the dial in the clockwise direction, the rotary switches SWa/SWb are changed between the on-state and the off-state as shown in FIG. 19B. The rotary switch SWb firstly turns on at time t10, but the other rotary switch SWa is still turned off. The rotary switch SWa turns on at time t11, and both of the rotary switches SWa/SWb are turned on between time t11 and time t12. The rotary switch SWb turns off at time t12, and only the rotary switch SWa remains on. The rotary switch SWa turns off at time t13, and both of the rotary switches SWa/SWb remain off.

The rotary switch SWa is connected in series to a resistor element R5, and the resistor element R5 has 33 kilo-ohms. The other rotary switch SWb is connected in series to a resistor element R6, and the resistor element R6 has 100 kilo-ohms. The series combination of rotary switch SWa and resistor element R5 and the other series combination of rotary switch SWb and resistor element R6 are connected in parallel between the terminals 54d and 54f. Thus, the four current paths 12A/R1a, 11A, SWb/R6 and SWa/R5 are connected in parallel between the signal terminal 54d and the ground terminal 54f.

The sticking/quasi-tension discriminator 21C comprises the analog-to-digital converter 213, the resistor R7 and a condenser C. The positive power supply line 21C is connected through the resistor R7 to the signal terminal 30d, and the input node of the analog-to-digital converter 213 is also connected to the signal terminal 30d. The different between the sticking/quasi-tension discriminators 21A and 21C is the condenser C connected between the signal terminal 30d and the ground line. The condenser C eliminates noise from the voltage signal varied by the head unit 1C.

Figure 20A:
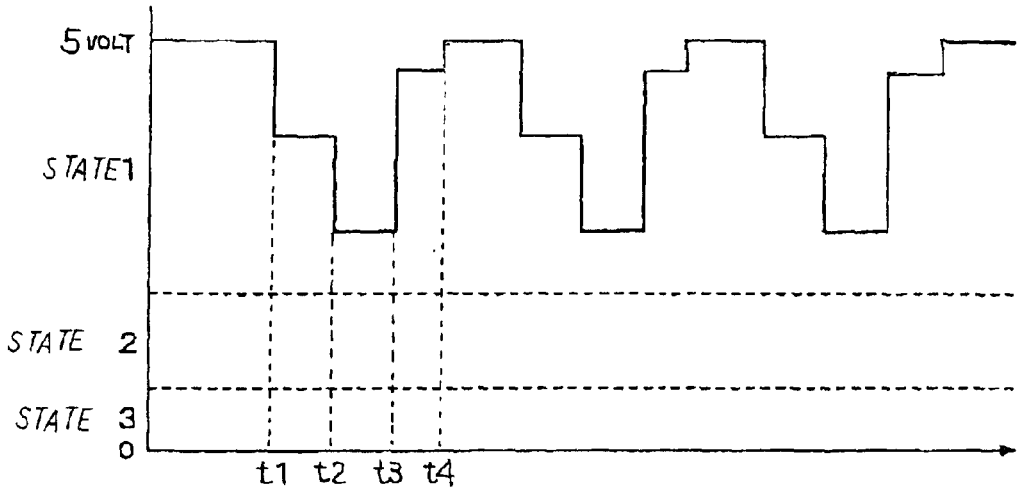
FIGS. 20A and 20B are graphs showing the potential level at an input node of an analog-to-digital converter.
Figure 20B:
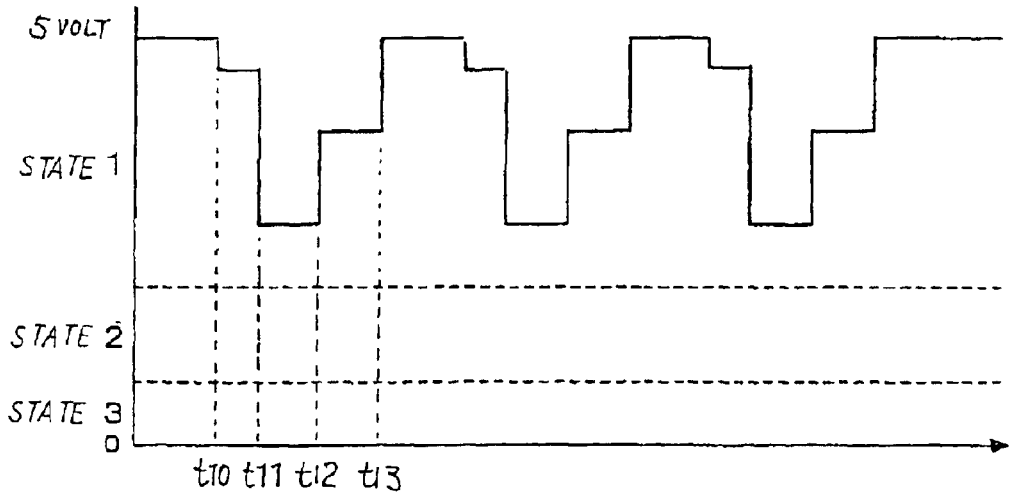

The rotary encoder 61 causes the potential level at the signal terminal 30d to vary as shown in FIGS. 20A and 20B. Both of the rim shot switches 11A/12A are assumed to be in the off-state. While a drummer is rotating the dial 61a in the counter clockwise direction, the potential level at the signal terminal 30d is varied as shown in FIG. 20A. The rotary switch SWa turns on at time t1, and the potential level is decayed. Subsequently, the rotary switch SWb turns on at time t2, and the current flows through both current paths SWa/R5 and SWb/R6. Then, the potential level is further decayed. The rotary switch SWa turns off at time t3, and the current flows only the rotary switch SWb. This results in potential rise. Finally, the rotary switch SWb turns off at time t4, and the potential level is recovered to 5 volts. Thus, the potential level at the signal terminal 30d is stepwise changed in the state 1.

On the other hand, while the drummer is rotating the dial 61a in the clockwise direction, the potential level at the signal terminal 30d is varied as shown in FIG. 20B. The rotary switch SWb turns on at time t10, and the potential level is decayed. Subsequently, the rotary switch SWa turns on at time t11, and the current flows through both current paths SWa/R5 and SWb/R6. Then, the potential level is further decayed. The rotary switch SWb turns off at time t12, and the current flows only the rotary switch SWa. This results in potential rise. Finally, the rotary switch SWa turns off at time t13, and the potential level is recovered to 5 volts. Thus, the potential level at the signal terminal 30d is stepwise changed in the state 1. However, the voltage pattern is different between the counter clockwise direction and the clockwise direction.

The potential level at the signal terminal 30d is converted to the digital detecting signal by means of the analog-to-digital converter 213. The central processing unit 24 discriminates the drummer's intention, and changes the timbre for the pad shots as similar to the tension controller of an acoustic snare drum. When the drummer gives the rim shots to the head unit 1C, the central processing unit 24 discriminates the open rim shot from the close rim shot as similar to the central processing unit 24 of the signal processing system 2A.

As will be understood from the foregoing description, the sticking/quasi-tension discriminator 2C produces the digital detecting signal representative of the drummer's intention of changing the timbre for the drum sound on the basis of the potential level at the signal terminal. For this reason, the four current paths 12A/R1a, 11A, SWb/R6 and SWa/R5 are connected through only one conductive line 31 to the signal terminal, and the system configuration of the electric drum becomes simpler than that of the prior art electronic drum.

Fourth Embodiment

Figure 21:
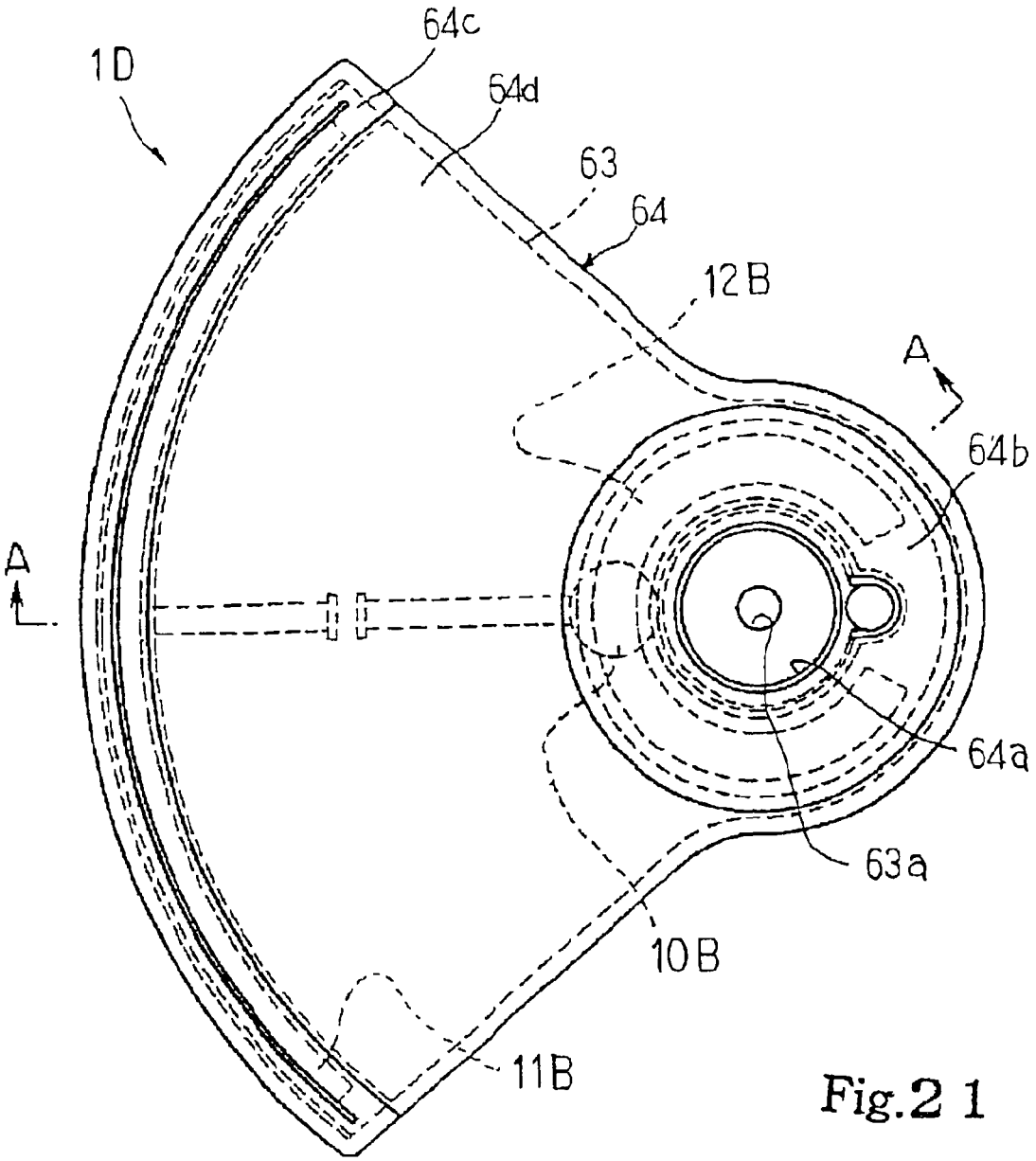
FIG. 21 is a plane view showing a contour of an electronic cymbal according to the present invention.
Figure 22:
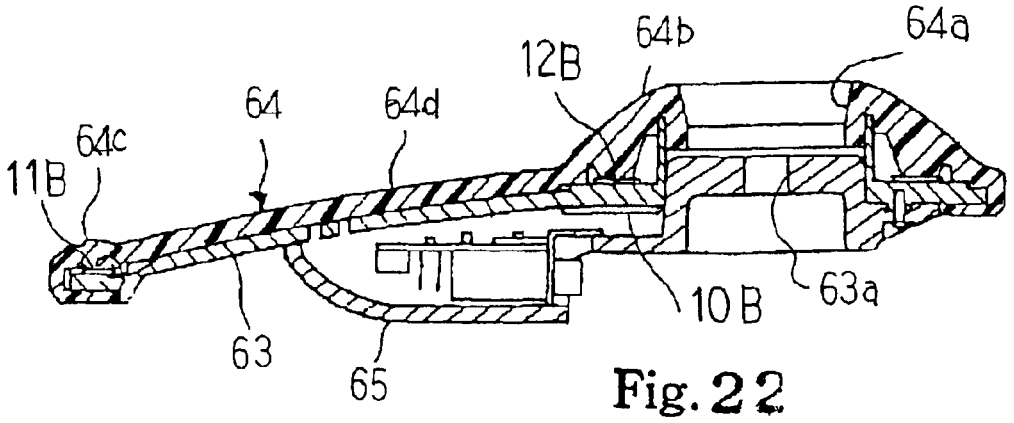
FIG. 22 is a cross sectional view taken along line A–A' of FIG. 21 and showing the structure of the electronic cymbal.

FIGS. 21 and 22 shows another sort of percussion instrument, i.e., an electronic cymbal embodying the present invention. The electronic cymbal largely comprises a cymbal body 1D, a signal processing system (not shown) and a cable (not shown). The cymbal body 1D serves as the player's console, and the signal processing system and cable are similar to those of the first, second or third embodiment.

The cymbal body 1D comprises a sectorial frame 63, a sectorial pad 64 and a case 65. The sectorial pad 64 is made of resilient material, and the sectorial frame 63 is covered with the sectorial pad 64. The sectorial frame 63 and sectorial pad 64 are spread over 90 degrees. The case 65 is fixed to the reverse surface of the sectorial frame 63, and circuit components such as a resistor and a connector, which are corresponding to the resistor R1 and connector 54, are accommodated in the space defined between the case 65 and the sectorial frame 63.

The sectorial frame 63 is formed with a small through-hole 63a, and the sectorial pad 64 is formed with a large through-hole 64a. The small through-hole 63a is nested in the large through-hole 64a, and the cymbal body 1D is coupled to a cymbal stand (not show) by using the through-holes 63a/64a.

The sectorial pad 64 is divided into three sections. The innermost section, outermost section and intermediate section are referred to as "cup", "rim" and "head", respectively. The cup, rim and head are labeled with references 64b, 64c and 64d, respectively.

A rim shot switch 11B is provided between the rim 64c and the corresponding portion of the sectorial frame 63, and extends over 90 degrees. A cup shot switch 12B is provided between the cup 64b and the corresponding portion of the sectorial frame 63, and extends over 270 degrees. The rim shot switch 11B is connected between a signal terminal of the connector and a ground terminal of the connector, and a series combination of the cup shot switch 12B and the resistor is also connected between the signal terminal and the ground terminal. A piezoelectric transducer 10B is secured to the reverse surface of the sectorial frame 63, and is connected between another signal terminal of the connector and the ground terminal. These two signal terminals are connected through two conductive lines of the cable to the signal input terminals of the signal processing system. Both of the rim shot switch 11B and the cup shot switch 12B are the normally-off type. The rim shot switches 11B/12B, piezoelectric transducer 10B and the associated resistors as a whole constitute the plural interfaces.

When a player beats the cup 64b, the cup shot switch 12B turns on, and the potential level at the input node of the sticking discriminator is decayed to an intermediate potential level between the positive power voltage and the ground voltage. On the other hand, when the player beats the rim 64c, the rim shot switch 11B turns on, and the potential level at the input node of the sticking discriminator is decayed to the ground level. The cup shots and rim shots give rise to vibrations of the sectorial frame 63, and the piezoelectric transducer 10B generates an analog envelope signal representative of the vibrations of the sectorial frame 63.

As will be understood, the sticking discriminator discriminates the cup shots from the rim shots on the basis of the potential level at the input node thereof. This results in that only one conductive line of the cable is shared between the rim shot switch 11B and the cup shot switch 12B. Thus, the sticking discriminator makes the system configuration simpler than that of the prior art electronic cymbal.

Fifth Embodiment

Figure 23:
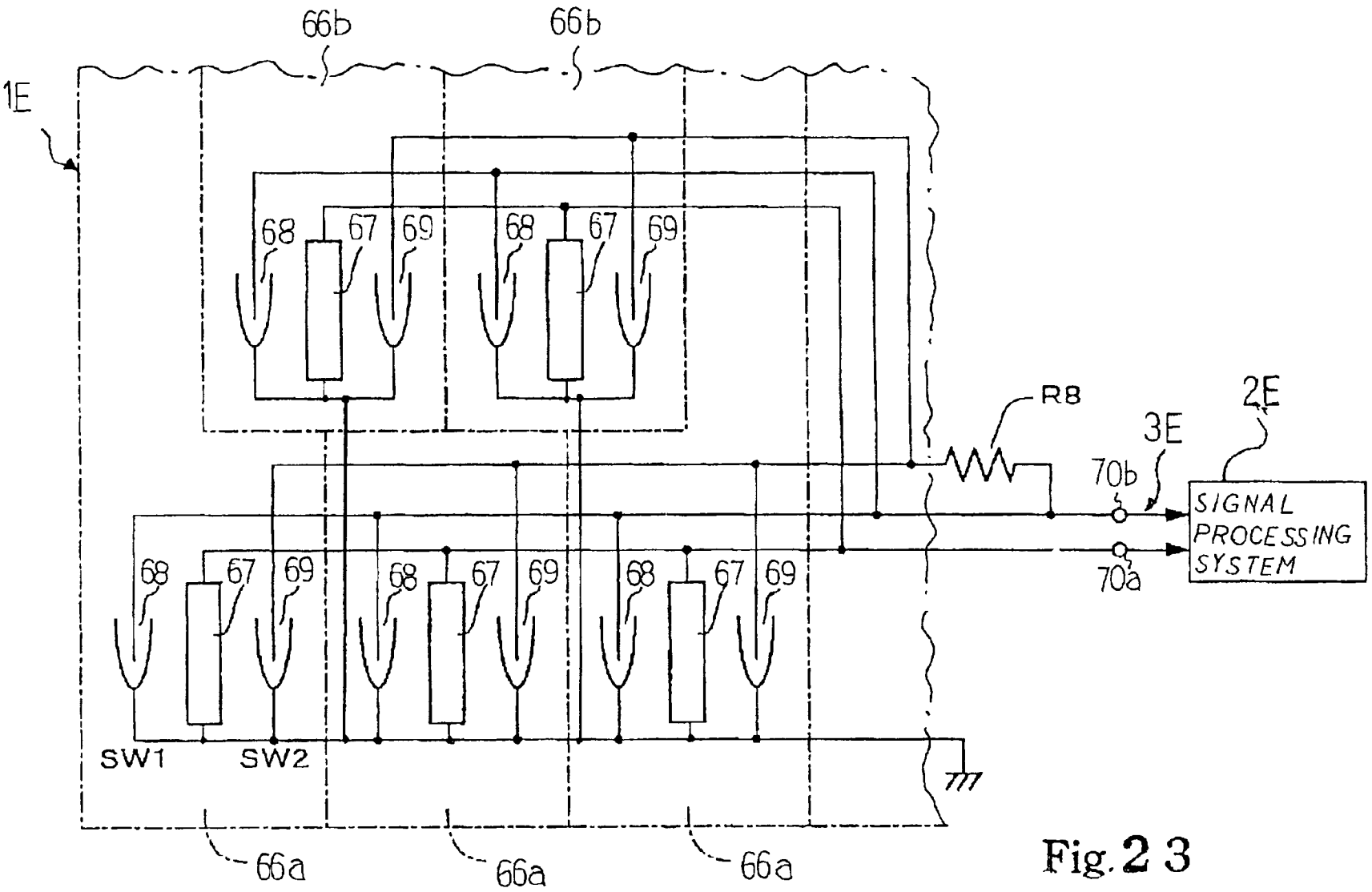
FIG. 23 is a diagram showing the system configuration of an electronic keyboard according to the present invention.

FIG. 23 shows an electronic keyboard embodying the present invention. The electronic keyboard largely comprises a keyboard 1E, a signal processing system 2E and a cable 3E. The keyboard 1E includes white keys 66a and black keys 66b, and the black/white keys 66b/66a are laid on the well-known keyboard pattern of an acoustic piano. Each of the black/white keys 66a/66b is associated with a piezoelectric transducer 67, a left switch 68 and a right switch 69. The piezoelectric transducers 67 are connected in parallel between a signal terminal 70a and a ground line, and the signal terminal 70a in turn is connected through one of the conductive lines of the cable 3E to the signal processing system 2E. The left switches 68 are connected in parallel between another signal terminal 70b and the ground line, and the signal terminal 70b in turn is connected through another conductive line of the cable 3E to a voltage discriminator of the signal processing system 2E. On the other hand, the right switches 69 are connected in parallel between a resistor R8 and the ground line, and the resistor R8 in turn is connected to the signal terminal 70b. Thus, both left and right switches 68/69 are connected directly to or through the resistor R8 to the signal terminal 70b. The piezoelectric transducer 67, left/right switches 68/69 and the associated resistors R8 as a whole constitute the plural interfaces.

Though not shown in FIG. 23, the black/white keys 66b/66a have actuators, respectively, and the actuators downwardly project from the reverse surfaces of the black/white keys 66b/66a toward the associated piezoelectric transducers 67. While the black/white keys 66b/66a are staying at the rest positions, the actuators are spaced from the associated piezoelectric transducers 67. When a player vertically depresses the black/white keys 66b/66a, the actuators are pressed to the piezoelectric transducers 67, and the piezoelectric transducers produces output signal representative of the intensity of the impacts of the actuators against the piezoelectric transducers 67. However, neither left switch 68 nor right switch 69 is not depressed with the actuators. When a player wishes to change the timbre or give an effect to the tones, the player obliquely depresses the black/white keys 66b/66a, the black/white keys 66b/66a cause the associated actuators to depress the left switches 68, and the potential level at the input node of the voltage discriminator is decayed to the ground. On the other hand, when the player obliquely depresses the black/white keys 66b/66a differently from the previous keying in, the actuators depress the right switches 69, and the right switches 69 make the input nodes of the voltage discriminator decayed to an intermediate potential level between the positive power level and the ground level. Thus, the voltage discriminator changes the digital detecting signal depending upon the switches 68/69 depressed by the actuators concurrently with the piezoelectric actuators 67, and the central processing unit produces music data codes representative of the pitch of the tone to be produced, loudness and effect to be imparted to the tone.

For example, in case where the player vertically depresses the black/white key 66b/66a, the actuator is pressed to only the piezoelectric transducer 67, and the left and right switches remain off. The signal processing system 2E imparts the vibrato to the tone at the loudness indicated by the output signal of the piezoelectric transducer. When the actuator depresses the piezoelectric transducer 67 and the left witch 68, the signal processing system 2E imparts the reverberation to the tone at the loudness indicated by the output signal of the piezoelectric transducer 67. On the other hand, when the actuator depresses the piezoelectric transducer 67 and the right switch 69, the signal processing system 2E imparts the pan effect to the tone at the loudness indicated by the output signal of the piezoelectric transducer 67.

As will be understood from the foregoing description, the signal processing system includes a voltage discriminator so that the left and right switches 68/69 are connected through the single conductive line to the voltage discriminator. This results in the simple system configuration.

The first aspect of the present invention is realized in the first to fifth embodiments. The electronic musical instruments fabricated on the basis of the first aspect of the present invention have the simple system configurations by virtue of the voltage discriminators, i.e., the sticking discriminator, sticking/quasi-tension discriminator and voltage discriminator.

In case where the player's console is separated from the signal processing system, the stereocable and conventional connector are available for the connection between the player's console and the signal processing system. This results in reduction in production cost.

Sixth Embodiment

Figure 24:
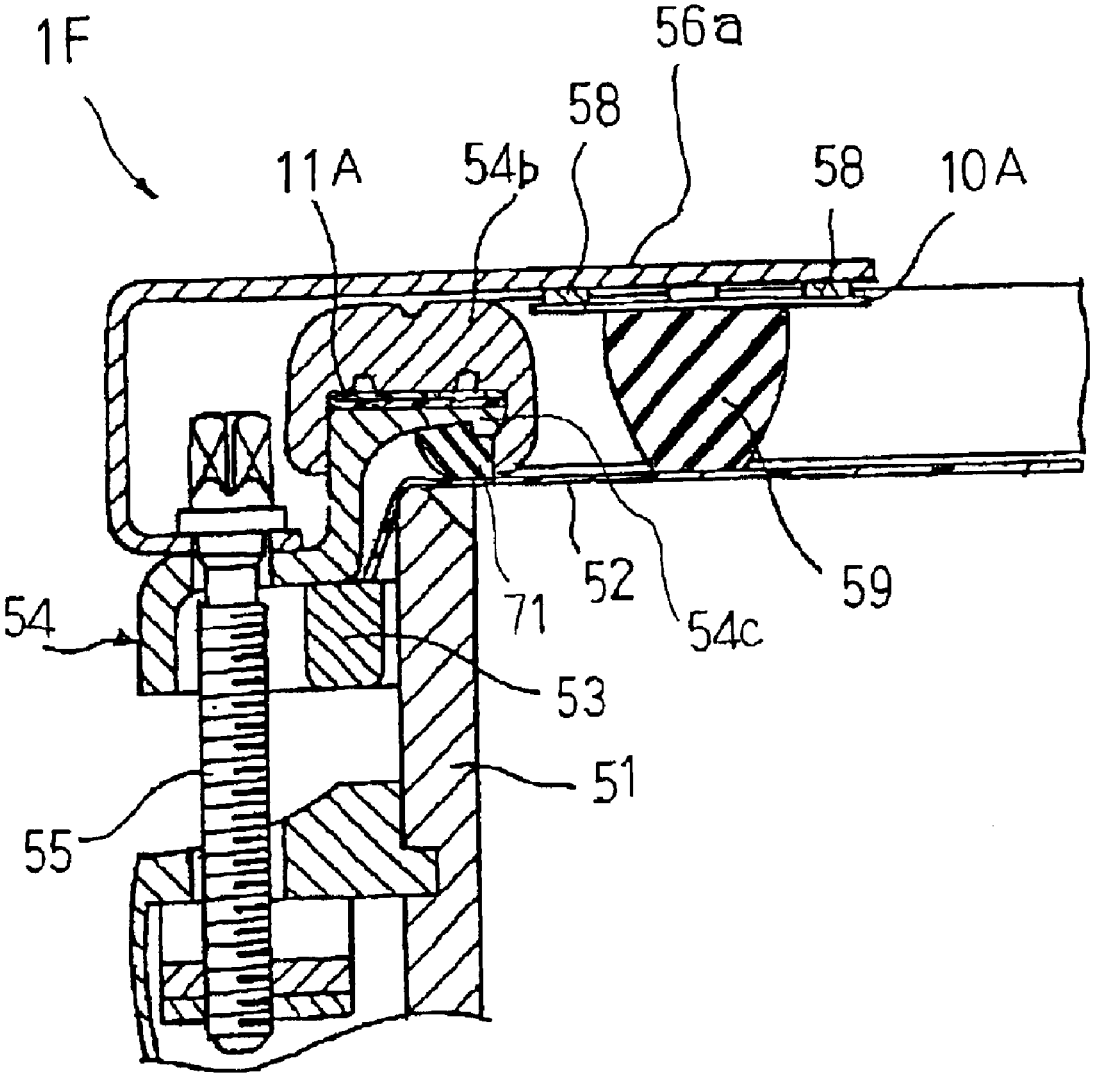
FIG. 24 is a cross sectional view showing the structure of a head unit incorporated in still another electronic drum according to the present invention.

FIG. 24 shows a head unit IF incorporated in still another electronic drum embodying the present invention. The head unit 1F serves as the player's console. Although the electronic drum implementing the sixth embodiment further includes a signal processing system (not shown) and a stereocable (not shown), the signal processing system and stereocable are not shown in the drawings, because they are similar to the signal processing system 2A and stereocable 3A (see FIG. 14).

The head unit 1F is similar in structure to the head unit 1A (see FIGS. 11 and 12) except for a vibration absorber 71. Although the rim cushion 54b is slightly different in contour from the rim cushion 54a, the other component parts are same as those of the head unit 1A. For this reason, the other components are labeled with references designating corresponding component parts of the head unit 1A without detailed description.

The vibration absorber 71 has a ring shape, and is provided between the rim 54 and the shell 51 along the periphery defining the upper opening. Although the vibration absorber 71 is fixed to the lower surface of the rim portion 54c inwardly projecting over the shell 51, the rim portion 54c is covered with the rim cushion 54b, and is hidden from the sticks. For this reason, drummers do not feel the vibration absorber 71 obstacle against the sticking. The vibration absorber 71 is held in contact with the head 52. In this instance, the vibration absorber 71 is made of cellular resilient material such as, for example, urethane form or rubber form. Otherwise, the vibration absorber 71 is made of resilient material such as rubber or urethane. Gel is also available for the vibration absorber 71.

Figure 25A:
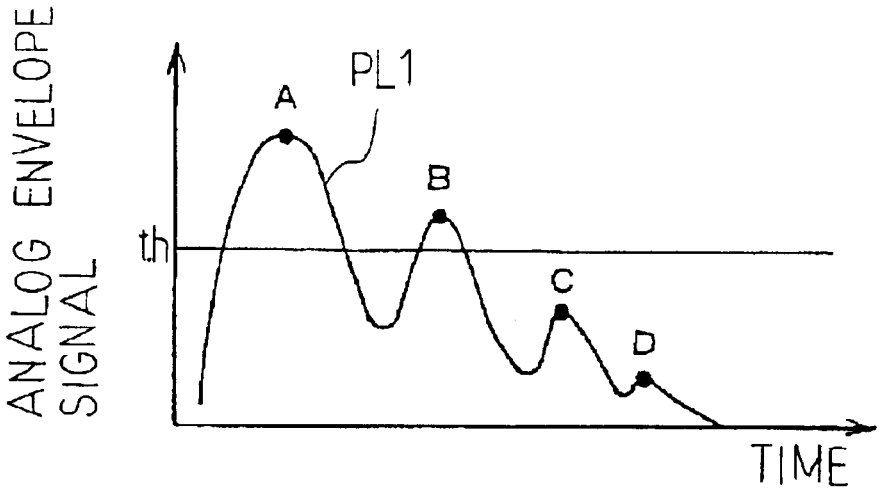
FIGS. 25A and 25B are graphs showing the vibrations propagated to a piezoelectric transducer without and through a vibration absorber.
Figure 25B:
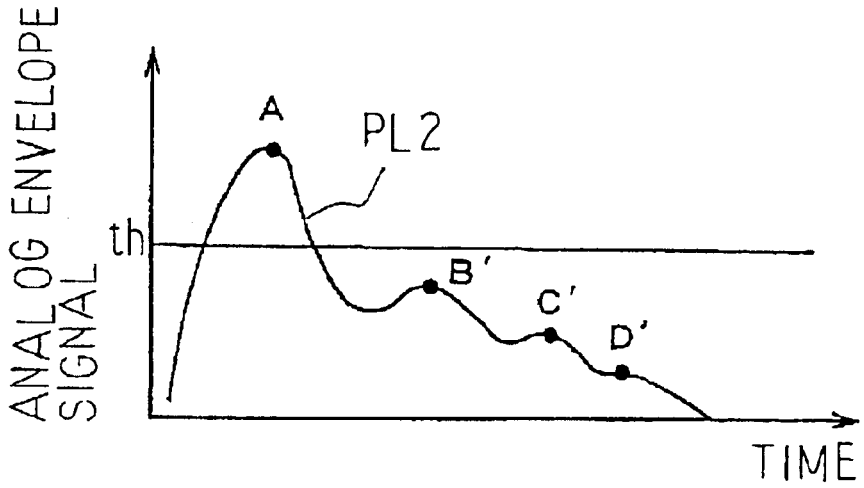

When a drummer gives the pad shot to the head 52, the pad shot gives rise to vibrations of the head 52, and the vibrations are propagated through the vibration absorber 71 to the rim 54, which in turn propagates the vibrations to the piezoelectric transducer 11A. The vibration absorber 71 rapidly decays the vibrations. If the vibration absorber 71 is not inserted between the head 52 and the piezoelectric transducer 11A, the vibrations are gradually decayed as indicated by plots PL1 in FIG. 25A. However, the vibration absorber 71 rapidly decays the vibrations as indicated by plots PL2 in FIG. 25B. The signal processing system is assumed to acknowledge the shot on the basis of the analog envelope signal over a threshold th. If the vibration absorber 71 is not inserted between the head 52 and the piezoelectric transducer 11A, the signal processing system mistakenly acknowledges two pad shots through the analog envelope signal, because the analog envelope signal twice exceeds the threshold th (see peaks A and B on the plots PL1). This results in that the electronic drum repeats the beat twice. However, the vibration absorber 71 drastically decays the analog envelope signal. The second peak B' is lower than the threshold th. This means that the signal processing system once acknowledges the pad shot on the basis of the first peak A on the plots PL2. The electronic drum once generates the beat. Thus, the vibration absorber 71 prevents the signal processing system from misunderstanding. Vibration absorber The vibration absorber 71 occupies the space between the upper edge of the shell 51 and the rim portion 54c along the periphery of the shell. Even though the drummer beats the head 52 anywhere he likes, the vibrations are propagated through the vibration absorber 71 to the piezoelectric transducer 11A, and the piezoelectric transducer 11A supplies the analog envelope signal exactly representing each shot to the signal processing system.

As will be understood from the foregoing description, the vibration absorber 71 makes the vibrations at each shot rapidly decayed. Even when a drummer repeats the shots, the signal processing system acknowledges only the first peak of the vibration waveform at each shot. For this reason, the electronic drum exactly produces the drum sound.

Although particular embodiments of the present invention have been shown and described, it will be apparent to those skilled in the art that various changes and modifications may be made without departing from the spirit and scope of the present invention.

The bottom case may be replaced with a cylindrical case. The cylindrical case is open at both ends thereof. One of the openings is closed with the head. However, the cylindrical case is open at the other end to the atmosphere.

The head unit 1 is available for the prior art electronic drum. Although the prior art signal processing system 200 can not discriminate the open rim shot from the close rim shot, the prior art signal processing system 200 selectively impart the timbre for the pad shots and the timbre for the rim shots to the drum sound when either rim shot switches 11/12 turns on.

The quasi-tension controller may be implemented by a variable resistor with a slider.

The rim shot switches may occupy the upper area of the rim at a ratio different from those of the above-described embodiments.

The quasi-tension controller 57 or 61 may be used for changing the timbre for the open rim shots and/or close rim shots. Drummers may select one of the percussion instruments forming a drum set by manipulating the quasi-tension controller 57 or 61. Thus, the quasi-tension controller 57 or 61 is available for controlling a timbre for drum sound.

The signal processing system 2E may change the timbre of the tones depending upon the switches 68/69 depressed by the actuator.

Plural piezoelectric transducers may be provided for the head unit. In this instance, the piezoelectric transducers are uniformly arranged over the head. The output signals of the piezoelectric transducers have different patterns depending upon a portion beaten with the sticks. The signal processing system analyzes the pattern, and determines the portion beaten with the sticks. The signal processing system gives one of the different timbres to the sound depending upon the portion beaten with the sticks. The signal processing system may have a pattern table so as to compare the give pattern with the candidates.

The piezoelectric transducer may be replaced with an optical sensor or magnetic sensor. The shot switches may be implemented by another sort of switch.

More than two switches may be connected through associated resistor elements different in resistance in parallel between a signal terminal and a ground terminal. In this instance, the potential level at the voltage discriminator is stepwise varied so that the voltage discriminator can discriminate the on-state switch on the basis of the input potential level.

Plural switches may be provided in association with pedals incorporated in an electronic musical instrument. The plural witches are connected to resistor elements different in resistance, and the series combinations of switches and resistor elements are connected in parallel between a signal terminal and a constant voltage line. The voltage discriminator can specify the pedal on which a player steps on the basis of the potential level at the signal terminal. In case where the plural switches are provided for a foot pedal of a bass drum, the signal processing system can give one of the different timbres to the drum sound depending upon the switch changed to the on-state through the foot pedal.

The open rim shot switch and close rim shot switch may be concentrically arranged on the head.

Even if the player's console and the signal processing system are incorporated in a monolithic body, the signal lines are simplified by virtue of the present invention.

Plural switches may be provided on the head for selectively imparting timbres to the drum sound.

What is claimed is:

1. An electronic musical instrument for generating electronic sound, comprising:

a player's console having plural interfaces to which a player selectively expresses intentions to said electronic sound, and producing signals representative of said intentions;

a signal processing system processing said signals so as to determine said [intensions] *intentions*, and producing said sound in which *said intentions are expressed*, said player's console and said signal processing system *being connected via signal paths* for propagating said signals from said *plural interfaces of said* player's console to said signal processing system; and

[an assistant] *a discriminator* provided in association with at least one of said plural interfaces and said signal processing system so as to [make] *discriminate* said intentions [clear], in which said plural interfaces *of said player's console* are categorized into a first group for producing one of said [signal] *signals* representative of a first attribute of said electronic sound and a second group containing more than one interface for producing another of said signals representative of a second attribute of said electronic sound [so that], *wherein said signal paths connecting said plural interfaces of said player's console and said signal processing system are provided in corresponding relation to the first group and the second group, respectively, of said plural interfaces of said player's console with a number of* said signal paths [are] *connecting said plural interfaces of said player's console and said signal processing system being* smaller [in] *than a* number [than] *of* said plural interfaces *of said player's console*, and in which said [assistant] *discriminator* discriminates an intention expressed by said player on the basis of said another of said signals.

2. The electronic musical instrument as set forth in claim 1, in which said first attribute and said second attribute are loudness of said electronic sound and timbre of said electronic sound, respectively.

3. The electronic musical instrument as set forth in claim 1, in which said player's console includes a first vibratory member in which said player gives rise to vibrations through sticking and associated with one of said plural interfaces so that said one of said plural interfaces converts said vibrations to one of said signals representative of a first attribute of said electronic sound, and a second vibratory member in which said player gives rise to vibrations through sticking and associated with more than one interface selected from said plural interfaces and selectively made active depending upon a sort of said sticking for producing another of said signals varied in potential level and representative of a second attribute of said electronic sound, and said [assistant] *discriminator* discriminates one of said intentions expressed by said player on the basis of said potential level of said another of said signals.

4. The electronic musical instrument as set forth in claim 3, in which said more than one interface has plural sensors associated with different portions of said second vibratory member and changed between first state and second state [for varying], *said plural sensors configured to vary* the amount of current passing through the sensors in said first state and at least one resistor selectively connected to said plural sensors [for varying] *and configured to vary* the resistance against said current so that said another of said signals varies said potential level depending upon the portion to which said player gives said sticking.

5. The electronic musical instrument as set forth in claim 3, in which said first attribute and said second attribute are loudness of said electronic sound and timbre of said electronic sound, respectively.

6. The electronic musical instrument as set forth in claim 3, in which said first vibratory member and said second vibratory member are a head and a rim for keeping said head stretched on a case.

7. The electronic musical instrument as set forth in claim 6, in which said head, said rim and said case give a contour [like] *of* an acoustic drum to said player's console.

8. The electronic musical instrument as set forth in claim 3, in which said first vibratory member and said second vibratory member are different portions of a vibratory body having a contour [like] *of* a part of an acoustic cymbal.

9. The electronic musical instrument as set forth in claim 1, in which said plural interfaces form plural groups respectively associated with plural keys selectively depressed by said player.

10. The electronic musical instrument as set forth in claim 9, in which said each of said plural groups has a first interface changed to active state for producing one of said signals when associated one of said keys is depressed in a first manner and second interfaces changed to active state for producing another of said signals together with said first interface when said associated one of said keys is depressed in a second manner, and said [assistant] *discriminator* discriminates an intention expressed by said player on the basis of said another of said signals.

11. The electronic musical instrument as set forth in claim 10, in which said second interfaces are connected through one of said signal paths so that said signal paths are smaller in number than said plural interfaces.

12. The electronic musical instrument as set forth in claim 1, in which said signal paths are formed in a three-core cable.

13. The electronic musical instrument as set forth in claim 1, in which said signal paths are formed in a two-core shield cable.

14. [The] An electronic musical instrument for generating electronic sound, comprising:

a player's console having plural interfaces to which a player selectively expresses intentions to said electronic sound, and producing signals representative of said intentions;

a signal processing system processing said signals so as to determine said intentions, and producing said sound in which said intentions are expressed;

signal paths connected between said player's console and said signal processing system for propagating said signals from said player's console to said signal processing system; [and]

[an assistant] *a discriminator* provided in association with at least one of said plural interfaces and said signal processing system so as to [make] *discriminate* said intentions [clear] *on the basis of the propagated signals*, in which one of said plural interfaces [is associated with a] *receives vibrations of two* vibratory [member] *members* in which said player gives rise to vibrations through sticking, and

[in which said assistant is implemented by] a *plurality of* vibration [absorber provide] *absorbers, each of the plurality of vibration absorbers being provided* between *any one of* said vibratory [member] *members* and said one of said plural interfaces for producing peaks respectively representative of impacts in said sticking in one of said signals.

15. A player's console for a musician, comprising:

plural vibratory members in which said musician selectively gives rise to vibrations through sticking for expressing intentions to music sound;

a [converter] *piezoelectric transducer* associated with said plural vibratory members for converting an attribute of said vibrations to a first signal, and connected to a first signal terminal *configured to output the first signal from the player's console*; and plural converters including plural sensors selectively associated with said plural vibratory members and changed between *a* first state and *a* second state [for varying the] *to vary an* amount of current passing [though] *through* the sensors in said first state and at least one resistor selectively connected to said plural sensors [for varying the] *to vary a* resistance against said current, and connected to a second signal terminal for producing a voltage signal representative of said intentions.

16. The player's console as set forth in claim 15, in which said attribute is the amplitude of said vibrations, and said intentions are timbre to be imparted to said music sound.

17. The player's console as set forth in claim 15, in which said plural sensors and said at least one resistor form plural series combinations connected in parallel between said second signal terminals and a constant potential source so that said plural [switches] *sensors* are selectively changed to said first state for varying said resistance against said current flowing into said second terminal while said musician is expressing said intentions through said sticking on said plural vibratory members.

18. The player's console as set forth in claim 15, in which said plural vibratory members are corresponding to a head and a rim for keeping said head stretched on a case.

19. The player's console as set forth in claim 18, in which said head, said rim and said case give a contour [like] *of* an acoustic drum thereto.

20. The player's console as set forth in claim 15, in which said plural vibratory members are different portions of a vibratory body having a contour [like] *of* a part of an acoustic cymbal.

[21. A player's consol for a musician, comprising:

a head and a rim for keening said head stretched over a case, said musician selectively gives rise to vibrations in said head and said rim through sticking for expressing intentions to music sound, said head, said rim and said case giving a contour like an acoustic drum to said player's console;

a converter associated with said plural vibratory members head and said rim for converting an attribute of said vibrations to a signal; and a vibration absorber connected between one of said head and rim and said converter, and decaying said vibrations immediately after each of the impacts in said sticking for giving said signal peaks respectively representing said impacts.]

[22. The player's console as set forth in claim 21, in which said plural vibratory members are a head and a rim for keeping said head stretched over a case, and said head, said rim and said case give a contour like an acoustic drum thereto.]

[23. The player's console as set forth in claim 21, in which said head is held in contact with said vibration absorber for transferring said vibrations through said vibration absorber to a piezoelectric transducer serving as said converter.]

[24. The player's console as set forth in claim 21, in which another of said plural vibratory members is a sensor holder fixed to said case in such a manner as to project into a space over said head, in which said converter is hung from said sensor holder by means of pieces of vibration absorbing adhesive compound, wherein said vibration absorber is fixed to said converter in such a manner as to be held in contact with said head.]

[25. The player's console as set forth in claim 24, in which said converter is mounted on yet another of said plural vibratory members through a vibration absorbing layer, and said pieces of vibration absorbing adhesive compound and said vibration absorber are secured to an upper surface and a lower surface of said yet another of said plural vibratory members, respectively.]

[26. The player's console as set forth in claim 25, in which said sensor holder has protrusions downwardly projecting from said lower surface, and said pieces of vibration absorbing adhesive compound are provided between said protrusions and said yet another of said plural vibratory members.]

27. A data processing system for producing a music signal representative of music sound, comprising:

a first signal terminal for receiving a first analog signal stepwise varied in potential level for expressing player's intentions to said music sound;

a second signal terminal for receiving a second analog signal representative of an attribute of said music sound;

a discriminator connected to said first signal terminal, determining said player's intentions on the basis of said potential level of said first analog signal for producing an output signal representative of said player's intentions, including a resistor element connected between a source of voltage and said first signal terminal so as to form a series combination together with other resistor elements incorporated in a source of said first analog signal, and an analog-to-digital converter connected to said first signal terminal for producing a digital signal representative of said potential level; and an information processing unit connected to said second signal terminal and said discriminator, and [processing] *configured to process* said output signal and said second analog signal [for producing] *to produce* said music signal representative of said music sound in which said player's intentions are expressed and to which said attribute is imparted.

[28. The signal processing system as set forth in claim 27, in which said discriminator includes a resistor element connected between a source of voltage and said first signal terminal so as to form a series combination together with at least one resistor element incorporated in a source of said first analog signal, and plural voltage comparators having first input nodes connected in parallel to said first signal terminal and second input nodes supplied with reference signals different in potential level for producing a multi-bit digital signal representative of said potential level.]

29. The signal processing system as set forth in claim 27, in which said discriminator further includes a condenser connected between said first signal terminal and a constant voltage source for eliminating noise from said first analog signal.

*30. The electronic musical instrument as claimed in claim 1,*

*wherein the plural interfaces includes a first sensor categorized into the first group and plural second sensors categorized into the second group,*

*wherein the first sensor produces the one signal representative of the first attribute of said electronic sound so as to propagate the one signal via a first signal path,*

*wherein the plural second sensors produce the another signal representative of the second attribute of said electronic sound so as to propagate the another signal via a second signal path, and*

*wherein the second signal path is smaller in number than the second sensors.*

*31. The electronic musical instrument as claimed in claim 1,*

*wherein the discriminator determines the sort of the another signal based on a potential level of the another signal.*

*32. The electronic musical instrument as claimed in claim 1, wherein the player's console and the signal processing system are connected with each other via a cable, and the signal paths are formed through the cable.*

*33. The electronic musical instrument as claimed in claim 32, wherein the cable is either a twin core cable type or a three core cable type.*

*34. The electronic musical instrument as claimed in claim 30, wherein the first sensor includes a piezoelectric transducer, and each of the plural second sensors includes a switch.*

*35. The electronic musical instrument as claimed in claim 34, wherein the switch is a film switch.*

*36. The electronic musical instrument as set forth in claim 30, wherein the plural second sensors are connected to the second signal path to propagate the another signal via the second signal path.*

*37. The electronic musical instrument as set forth in claim 30, wherein the plural second sensors are implemented as two switches and the second signal path is implemented as a single signal line.*

*38. The electronic musical instrument as claimed in claim 1, wherein the player's console is implemented as either a snare drum or a cymbal.*

*39. The player's console as claimed in claim 15, wherein each of the plural sensors includes a film switch.*

*40. The player's console as claimed in claim 15, which is connected with a signal processing system in an electronic musical instrument via the first and second signal terminals.*

*41. The player's console as claimed in claim 15, wherein the player's console is implemented as either a snare drum or a cymbal.*

*42. The electronic musical instrument as claimed in claim 14, wherein one of the two vibratory members is a sensor holder inwardly projected from a periphery of the player's console and holding the one of the plural interfaces so that the one of the plural interfaces faces toward another of the two vibratory members.*

*43. The electronic musical instrument as claimed in claim 14, wherein a contact area between one of the plurality of vibration absorbers and the one of said plural interfaces is greater than a contact area between the one of the plurality of vibration absorbers and one of the two vibratory members.*

*44. The electronic musical instrument as claimed in claim 14, wherein said one of the plural interfaces includes a piezoelectric transducer.*

*45. The electronic musical instrument as claimed in claim 14, wherein the plural interfaces of the player's console include a rim shot switch.*

* * * * *